United States Patent
Liu et al.

(10) Patent No.: US 10,712,556 B2
(45) Date of Patent: Jul. 14, 2020

(54) IMAGE INFORMATION PROCESSING METHOD AND AUGMENTED REALITY AR DEVICE

(71) Applicant: Huawei Technologies Co., Ltd., Shenzhen (CN)

(72) Inventors: Haibo Liu, Shenzhen (CN); Meiwen Yang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 153 days.

(21) Appl. No.: 15/565,555

(22) PCT Filed: Dec. 31, 2015

(86) PCT No.: PCT/CN2015/100331
§ 371 (c)(1),
(2) Date: Oct. 10, 2017

(87) PCT Pub. No.: WO2017/113403
PCT Pub. Date: Jul. 6, 2017

(65) Prior Publication Data
US 2018/0120561 A1   May 3, 2018

(51) Int. Cl.
*G02B 27/01* (2006.01)
*G06K 9/00* (2006.01)
(Continued)

(52) U.S. Cl.
CPC .............. *G02B 27/01* (2013.01); *B60R 1/00* (2013.01); *G06K 9/00671* (2013.01);
(Continued)

(58) Field of Classification Search
CPC .............. G02B 27/01; G02B 2027/014; G02B 2027/0138; G02B 2027/0141; G06K 9/34;
(Continued)

(56) References Cited

U.S. PATENT DOCUMENTS

2010/0103262 A1*  4/2010  Fardi .................. B60R 1/00
                                                            348/148
2010/0253489 A1*  10/2010  Cui .................. G01S 13/867
                                                            340/425.5
(Continued)

FOREIGN PATENT DOCUMENTS

| CN | 101876752 A | 11/2010 |
|---|---|---|
| CN | 101902598 A | 12/2010 |

(Continued)

OTHER PUBLICATIONS

Machine Translation and Abstract of Chinese Publication No. CN102158684, Aug. 17, 2011, 26 pages.
(Continued)

*Primary Examiner* — Carolyn R Edwards
(74) *Attorney, Agent, or Firm* — Conley Rose, P.C.

(57) ABSTRACT

An image information processing method includes obtaining, by an AR device, a first image including an image of a target object. The method includes detecting an environmental parameter of the AR device based on the first image. The method includes determining a cropping ratio coefficient of the first image based on the environmental parameter. The method includes cropping the first image based on the cropping ratio coefficient, to obtain a second image. The method includes extracting M contour feature points in a remaining image of the target object from the second image, to generate an AR image of the target object. The method includes displaying the AR image on a front windshield of a car.

18 Claims, 14 Drawing Sheets

(51) Int. Cl.
  *G06K 9/34* (2006.01)
  *B60R 1/00* (2006.01)
  *G06T 7/73* (2017.01)
  *G06K 9/46* (2006.01)
(52) U.S. Cl.
  CPC ........... *G06K 9/00791* (2013.01); *G06K 9/34* (2013.01); *G06K 9/342* (2013.01); *G06K 9/4604* (2013.01); *G06T 7/74* (2017.01); *B60R 2300/205* (2013.01); *B60R 2300/308* (2013.01); *G02B 2027/014* (2013.01); *G02B 2027/0138* (2013.01); *G02B 2027/0141* (2013.01); *G06T 2207/30252* (2013.01); *G06T 2207/30268* (2013.01)
(58) Field of Classification Search
  CPC .. G06K 9/00791; G06K 9/4604; G06K 9/342; G06K 9/00671; G06T 7/74; G06T 2207/30252; G06T 2207/30268; B60R 1/00; B60R 2300/205; B60R 2300/308
  See application file for complete search history.

(56) References Cited

U.S. PATENT DOCUMENTS

| | | | | |
|---|---|---|---|---|
| 2010/0253493 | A1* | 10/2010 | Szczerba | G08G 1/167 340/435 |
| 2011/0187844 | A1* | 8/2011 | Ogawa | B60R 1/00 348/78 |
| 2011/0304765 | A1* | 12/2011 | Yogo | G02B 7/34 348/345 |
| 2013/0141250 | A1* | 6/2013 | Mathieu | B60K 35/00 340/901 |
| 2013/0293582 | A1* | 11/2013 | Ng-Thow-Hing | G06T 19/006 345/633 |
| 2015/0203036 | A1* | 7/2015 | Kajiwara | G08G 1/166 345/7 |
| 2016/0082840 | A1* | 3/2016 | Yoshida | B60K 35/00 701/36 |

FOREIGN PATENT DOCUMENTS

| | | |
|---|---|---|
| CN | 102149574 A | 8/2011 |
| CN | 102158684 A | 8/2011 |
| CN | 102308241 A | 1/2012 |
| CN | 102910130 A | 2/2013 |
| CN | 103182984 A | 7/2013 |
| CN | 103366708 A | 10/2013 |
| CN | 105163972 A | 12/2015 |
| JP | 2004306792 A | 11/2004 |
| KR | 20150042478 A | 4/2015 |

OTHER PUBLICATIONS

Machine Translation and Abstract of Chinese Publication No. CN102910130, Feb. 6, 2013, 11 pages.
Machine Translation and Abstract of Chinese Publication No. CN103182984, Jul. 3, 2013, 17 pages.
Machine Translation and Abstract of Chinese Publication No. CN103366708, Oct. 23, 2013, 20 pages.
Foreign Communication From a Counterpart Application, PCT Application No. PCT/CN2015/100331, English Translation of International Search Report dated Sep. 23, 2016, 2 pages.
Foreign Communication From a Counterpart Application, European Application No. 201580084719.0, Extended European Search Report dated Jun. 18, 2019, 9 pages.
Machine Translation and Abstract of Japanese Publication No. 2004306792, Nov. 4, 2004, 13 pages.
Foreign Communication From a Counterpart Application, Chinese Application No. 201580084719.0, Chinese Office Action dated Jan. 3, 2020, 8 pages.
Machine Translation and Abstract of Korean Publication No. KR20150042478, Apr. 21, 2015, 19 pages.
Foreign Communication From a Counterpart Application, Chinese Application No. 201580084719.0, Chinese Office Action dated Jun. 18, 2019, 9 pages.

* cited by examiner

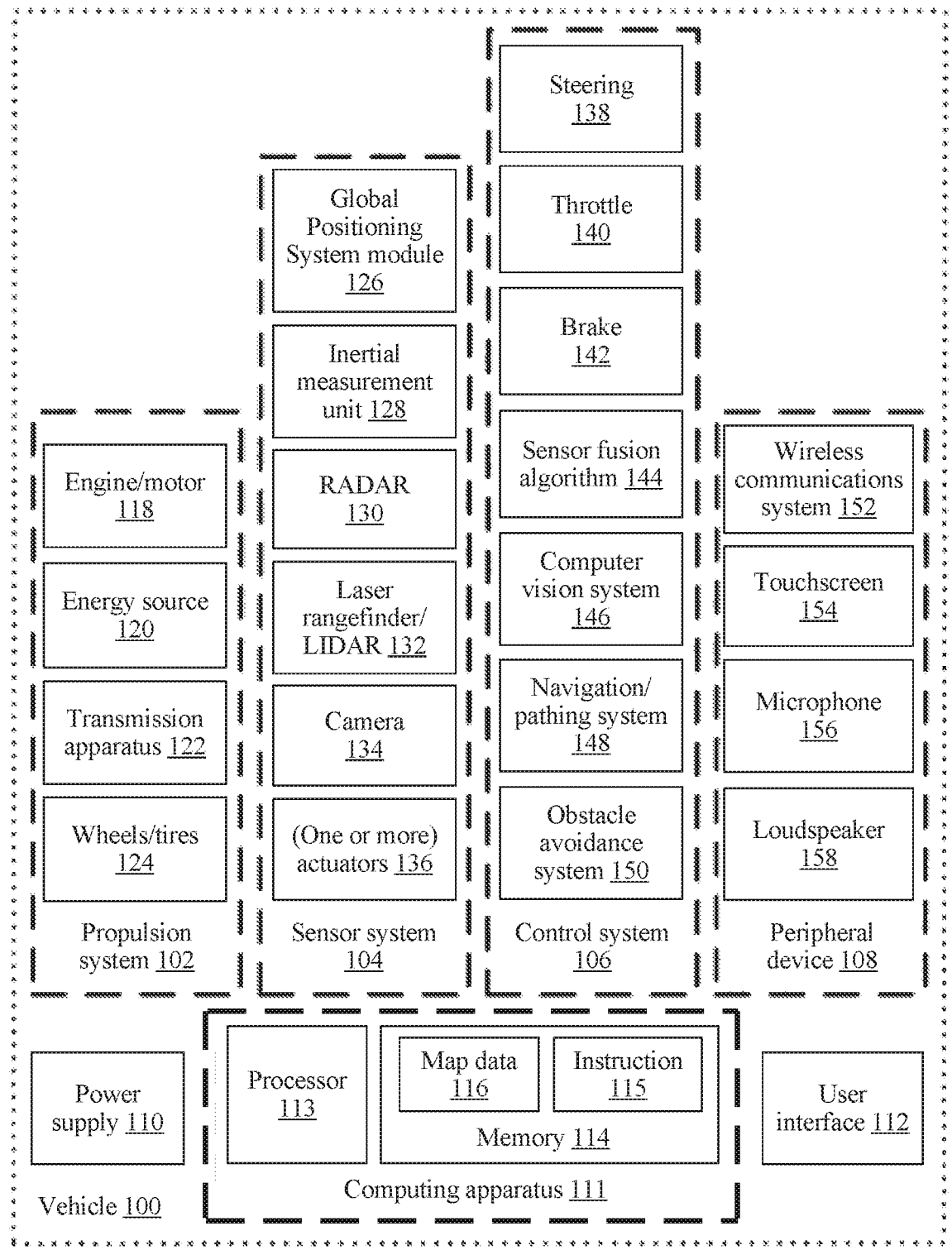
FIG. 1.1

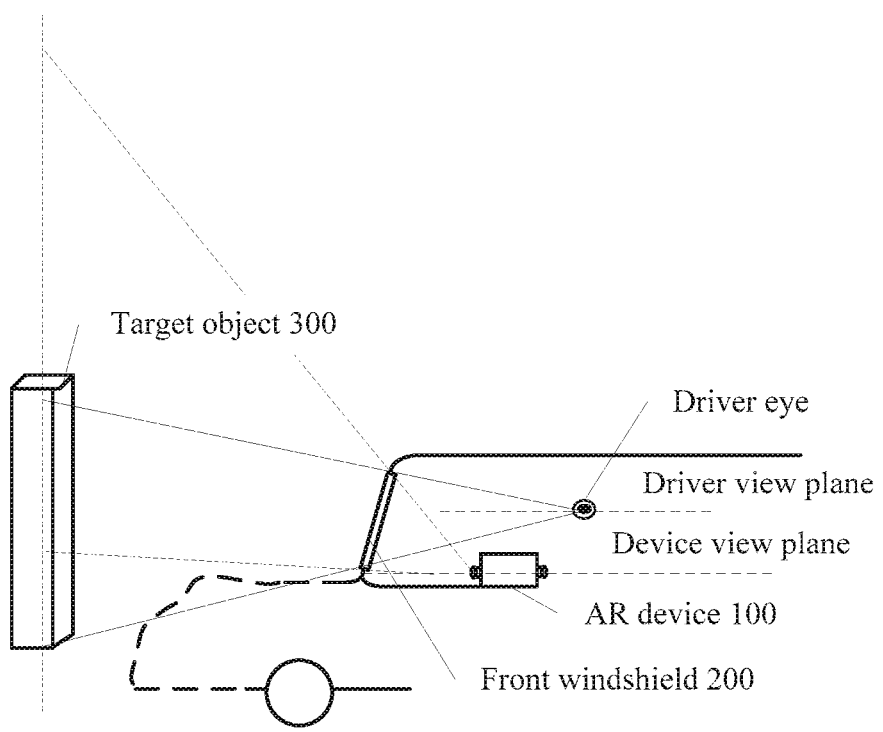
FIG. 1.2

```
┌─────────────────────────────────────────────────────────────┐
│ An AR device photographs a target object by using a ranging │   S401
│ feature point on the target object as a focusing reference  │
│ point, to obtain a first image                              │
└─────────────────────────────────────────────────────────────┘
                              ▼
┌─────────────────────────────────────────────────────────────┐
│ The AR device detects a distance c0 between the ranging     │
│ feature point and a central point of the AR device based    │
│ on a relative location of the focus of the first image in   │   S402
│ the first image, and determines an included angle q0        │
│ between a device view plane and a line segment corresponding│
│ to the distance c0                                          │
└─────────────────────────────────────────────────────────────┘
                              ▼
┌─────────────────────────────────────────────────────────────┐
│ The AR device photographs a driver image to obtain a        │
│ reference image; detects a first distance c1 between a      │
│ driver-eye central point and the central point of the AR    │
│ device based on a relative location of a driver-eye         │   S403
│ central point pixel of the reference image in the reference │
│ image; and determines an included angle q1 between the      │
│ device view plane and a line segment corresponding to the   │
│ first distance c1                                           │
└─────────────────────────────────────────────────────────────┘
                              ▼
┌─────────────────────────────────────────────────────────────┐
│ The AR device detects a second distance c2 between a        │
│ feature point B' on an upper edge of a front windshield     │
│ and the central point of the AR device, and an included     │
│ angle q2 between the device view plane and a line segment   │   S404
│ corresponding to the second distance c2; and detects a      │
│ third distance c3 between a feature point C' on a lower     │
│ edge of the front windshield and the central point of the   │
│ AR device, and an included angle q3 between the device view │
│ plane and a line segment corresponding to the third         │
│ distance c3                                                 │
└─────────────────────────────────────────────────────────────┘
                              ▼
┌─────────────────────────────────────────────────────────────┐
│ The AR device indicates the central point of the AR device  │
│ as an origin O of a two-dimensional coordinate system XOY;  │
│ indicates, as a straight line L, a straight line that passes│
│ through the ranging feature point on the target object and  │   S405
│ is perpendicular to the device view plane; determines a     │
│ reference plane of the two-dimensional coordinate system    │
│ XOY based on the origin O and the straight line L; and      │
│ indicates a projected straight line of the device view plane│
│ on the reference plane as an X axis                         │
└─────────────────────────────────────────────────────────────┘
                              ▼
┌─────────────────────────────────────────────────────────────┐
│ The AR device indicates a projected point of the driver-eye │
│ central point on the reference plane as a point A in the    │
│ two-dimensional coordinate system XOY; indicates a projected│   S406
│ point of the feature point B' on the reference plane as a   │
│ point B; indicates a projected point of the feature point C'│   TO
│ on the reference plane as a point C; and indicates a        │   FIG. 4B
│ projected straight line of a driver view plane on the       │
│ reference plane as a straight line N                        │
└─────────────────────────────────────────────────────────────┘
```

FIG. 4A

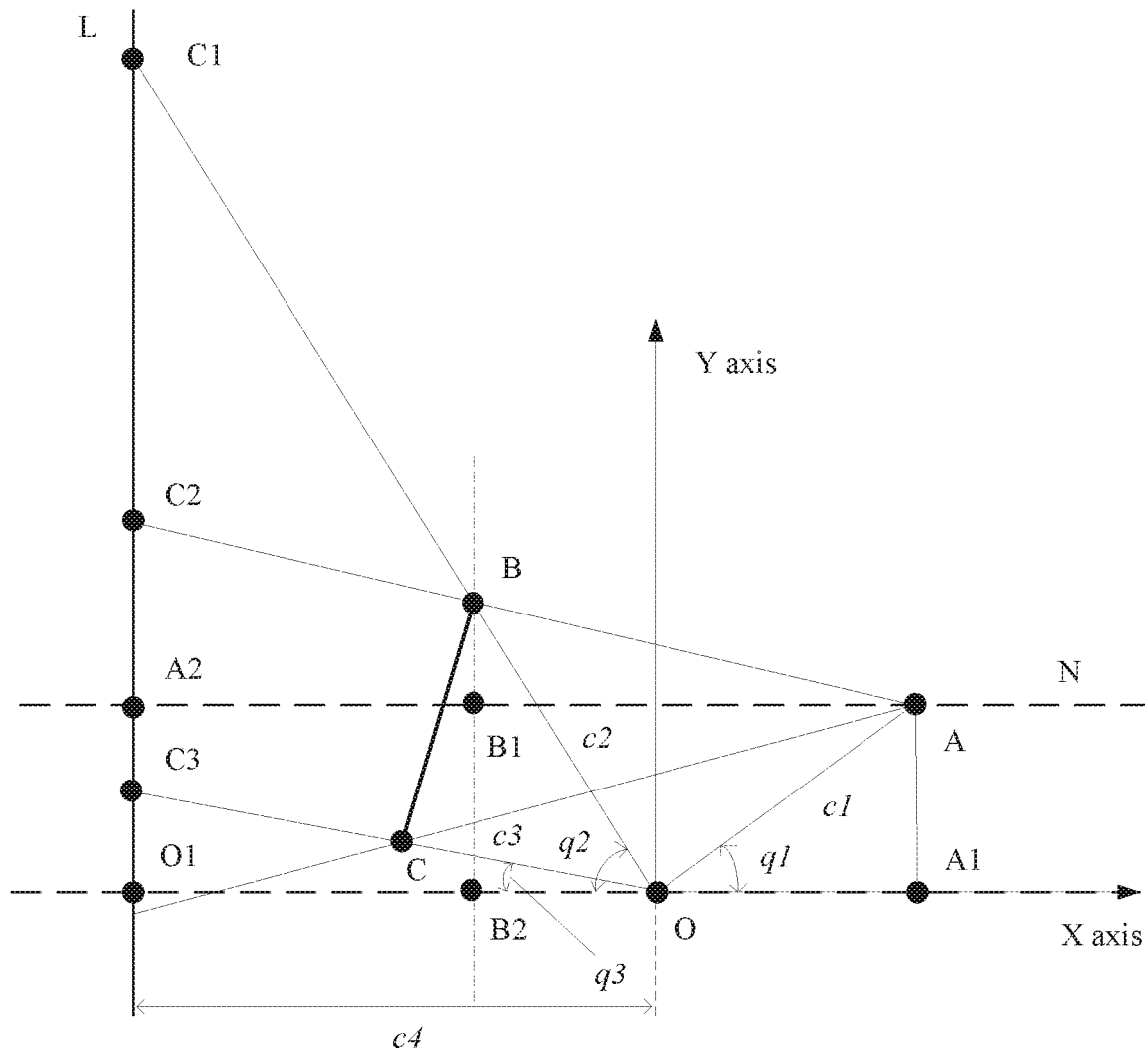
FIG. 4.1

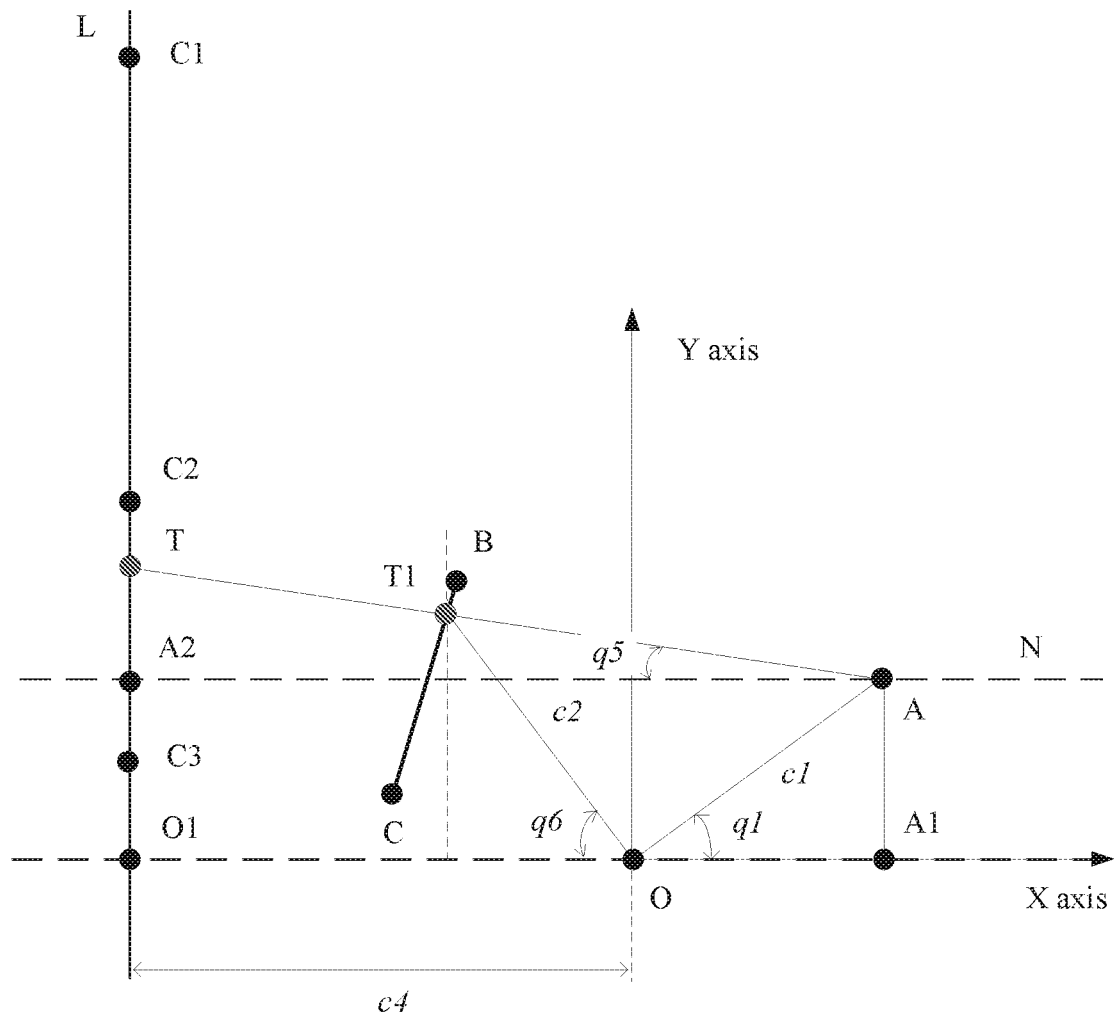
FIG. 4.2

```
┌─────────────────────────────────────────────────────────┐
│ An AR device photographs a target object by using a     │  S501
│ ranging feature point on the target object as a         │
│ focusing reference point, to obtain a first image       │
└─────────────────────────────────────────────────────────┘
                              ▼
┌─────────────────────────────────────────────────────────┐
│ The AR device detects a distance c0 between the ranging │
│ feature point and a central point of the AR device      │
│ based on a relative location of the focus of the first  │  S502
│ image in the first image, and determines an included    │
│ angle q0 between a device view plane and a line segment │
│ corresponding to the distance c0                        │
└─────────────────────────────────────────────────────────┘
                              ▼
┌─────────────────────────────────────────────────────────┐
│ The AR device photographs a driver image to obtain a    │
│ reference image; detects a first distance c1 between a  │
│ driver-eye central point and the central point of the   │  S503
│ AR device based on a relative location of a driver-eye  │
│ central point pixel of the reference image in the       │
│ reference image; and determines an included angle q1    │
│ between the device view plane and a line segment        │
│ corresponding to the first distance c1                  │
└─────────────────────────────────────────────────────────┘
                              ▼
┌─────────────────────────────────────────────────────────┐
│ The AR device detects a second distance c2 between a    │
│ feature point B' on an upper edge of a front windshield │
│ and the central point of the AR device, and an included │
│ angle q2 between the device view plane and a line       │  S504
│ segment corresponding to the second distance c2; and    │
│ detects a third distance c3 between a feature point C'  │
│ on a lower edge of the front windshield and the central │
│ point of the AR device, and an included angle q3        │
│ between the device view plane and a line segment        │
│ corresponding to the third distance c3                  │
└─────────────────────────────────────────────────────────┘
                              ▼
┌─────────────────────────────────────────────────────────┐
│ The AR device indicates the central point of the AR     │
│ device as an origin O of a two-dimensional coordinate   │
│ system XOY; indicates, as a straight line L, a straight │
│ line that passes through the ranging feature point on   │  S505
│ the target object and is perpendicular to the device    │
│ view plane; determines a reference plane of the         │
│ two-dimensional coordinate system XOY based on the      │
│ origin O and the straight line L; and indicates a       │
│ projected straight line of the device view plane on     │
│ the reference plane as an X axis                        │
└─────────────────────────────────────────────────────────┘
                              ▼
┌─────────────────────────────────────────────────────────┐
│ The AR device indicates a projected point of the        │
│ driver-eye central point on the reference plane as a    │
│ point A in the two-dimensional coordinate system        │  S506
│ XOY; indicates a projected point of the feature point   │
│ B' on the reference plane as a point B; indicates a     │  TO
│ projected point of the feature point C' on the          │  FIG. 5B
│ reference plane as a point C; and indicates a projected │
│ straight line of a driver view plane on the reference   │
│ plane as a straight line N                              │
└─────────────────────────────────────────────────────────┘
```

FIG. 5A

```
┌─────────────────────────────────────────────────────────────┐
│ An AR device photographs a target object by using a ranging │  S601
│ feature point on the target object as a focusing reference  │
│ point, to obtain a first image                              │
└─────────────────────────────────────────────────────────────┘
                              ▼
┌─────────────────────────────────────────────────────────────┐
│ The AR device detects a distance c0 between the ranging     │
│ feature point and a central point of the AR device based    │
│ on a relative location of the focus of the first image in   │  S602
│ the first image, and determines an included angle q0        │
│ between a device view plane and a line segment              │
│ corresponding to the distance c0                            │
└─────────────────────────────────────────────────────────────┘
                              ▼
┌─────────────────────────────────────────────────────────────┐
│ The AR device photographs a driver image to obtain a        │
│ reference image; detects a first distance c1 between a      │
│ driver-eye central point and the central point of the AR    │
│ device based on a relative location of a driver-eye central │  S603
│ point pixel of the reference image in the reference image;  │
│ and determines an included angle q1 between the device      │
│ view plane and a line segment corresponding to the first    │
│ distance c1                                                 │
└─────────────────────────────────────────────────────────────┘
                              ▼
┌─────────────────────────────────────────────────────────────┐
│ The AR device detects a second distance c2 between a        │
│ feature point B' on an upper edge of a front windshield     │
│ and the central point of the AR device, and an included     │
│ angle q2 between the device view plane and a line segment   │  S604
│ corresponding to the second distance c2; and detects a      │
│ third distance c3 between a feature point C' on a lower     │
│ edge of the front windshield and the central point of the   │
│ AR device, and an included angle q3 between the device      │
│ view plane and a line segment corresponding to the third    │
│ distance c3                                                 │
└─────────────────────────────────────────────────────────────┘
                              ▼
┌─────────────────────────────────────────────────────────────┐
│ The AR device indicates the central point of the AR device  │
│ as an origin O of a two-dimensional coordinate system       │
│ XOY; indicates, as a straight line L, a straight line that  │
│ passes through the ranging feature point on the target      │  S605
│ object and is perpendicular to the device view plane;       │
│ determines a reference plane of the two-dimensional         │
│ coordinate system XOY based on the origin O and the         │
│ straight line L; and indicates a projected straight line of │
│ the device view plane on the reference plane as an X axis   │
└─────────────────────────────────────────────────────────────┘
                              ▼
┌─────────────────────────────────────────────────────────────┐
│ The AR device indicates a projected point of the driver-eye │
│ central point on the reference plane as a point A in the    │
│ two-dimensional coordinate system XOY; indicates a          │  S606
│ projected point of the feature point B' on the reference    │
│ plane as a point B; indicates a projected point of the      │  TO
│ feature point C' on the reference plane as a point C; and   │  FIG. 6B
│ indicates a projected straight line of a driver view plane  │
│ on the reference plane as a straight line N                 │
└─────────────────────────────────────────────────────────────┘
```

FIG. 6A

IMAGE INFORMATION PROCESSING METHOD AND AUGMENTED REALITY AR DEVICE

CROSS-REFERENCE TO RELATED APPLICATION

This application is a National Stage of International Application No. PCT/CN2015/100331, filed on Dec. 31, 2015, which is hereby incorporated by reference in its entirety.

FIELD OF THE INVENTION

The present disclosure relates to the field of image processing technologies, and specifically, to an image information processing method and an augmented reality (AR) device.

BACKGROUND

In a process in which a car travels at a high speed, a driver needs to be highly concentrated to know a dynamic status of an environment within a line of sight in real time, for example, a roadblock, a pedestrian, an uneven road, or a fork, so as to ensure driving safety.

The inventor of this technical solution finds in a research process that the following problem exists: Because human eyesight is limited and the driver is easily affected by both internal and external factors such as fatigue driving and low environment visibility, if the driver looks at a target object within the line of sight only with eyes, it is difficult for the driver to always know the dynamic status of the environment clearly in a driving process. Consequently, driving safety is affected.

SUMMARY

Embodiments of the present disclosure provide an image information processing method and an augmented reality (AR) device, so as to help a driver comprehensively and clearly obtain a dynamic status of an environment within a line of sight, so that driving safety is improved.

A first aspect of the embodiments of the present disclosure discloses an image information processing method, and the method includes:

obtaining, by an AR device, a first image including an image of a target object, where the AR device is disposed on a center console of a car, and the target object is located in front of the car;

detecting, by the AR device, an environmental parameter of the AR device based on the first image;

determining, by the AR device, a cropping ratio coefficient of the first image based on the environmental parameter;

cropping, by the AR device, the first image based on the cropping ratio coefficient, to obtain a second image;

extracting, by the AR device, M contour feature points in a remaining image of the target object from the second image, to generate an AR image of the target object, where M is a positive integer; and displaying, by the AR device, the AR image on a front windshield of the car.

It can be learned that the AR device can generate the AR image of the target object, and the AR image displayed on the front windshield of the car helps a driver comprehensively and clearly obtain a dynamic status of an environment within a line of sight, and helps improve driving safety. For example, in a process in which the driver drives at night, when a pedestrian appears in a driving direction, the AR device can quickly output an AR image (such as image contour information of the pedestrian) that conforms to the pedestrian. The AR image displayed on the front windshield of the car helps the driver comprehensively and clearly obtain a dynamic status of the pedestrian within the line of sight, so that driving safety is improved.

In a first possible implementation of the first aspect of the embodiments of the present disclosure, the displaying, by the AR device, the AR image on a front windshield of the car includes:

adding, by the AR device, the AR image to a third image according to locations of the M contour feature points in the second image, where the third image is a blank image, and a size of the third image matches a size of the second image;

determining, by the AR device, a projection angle of the AR image based on the contour feature points in the AR image and the environmental parameter; and projecting, by the AR device, the third image on the front windshield according to the projection angle.

In a second possible implementation of the first aspect of the embodiments of the present disclosure, the displaying, by the AR device, the AR image on a front windshield of the car includes:

determining, by the AR device, a projection angle of the AR image based on the contour feature points in the AR image and the environmental parameter; and projecting, by the AR device, the AR image on the front windshield according to the projection angle.

In a third possible implementation of the first aspect of the embodiments of the present disclosure, the front windshield includes a display screen, and the displaying, by the AR device, the AR image on a front windshield of the car includes:

determining, by the AR device, locations of M projected points that are corresponding to the M contour feature points and are on the front windshield; and displaying, by the AR device, the AR image on the display screen of the front windshield of the car based on the locations of the M projected points.

With reference to any one of the first aspect of the embodiments of the present disclosure, or the first to the third possible implementations of the first aspect, in a fourth possible implementation of the first aspect of the embodiments of the present disclosure, the obtaining, by an AR device, a first image including an image of a target object includes photographing, by the AR device, the target object by using a ranging feature point on the target object as a focusing reference point, to obtain the first image, where a pixel that is in the first image and is corresponding to the focusing reference point is a focus of the first image.

With reference to the fourth possible implementation of the first aspect of the embodiments of the present disclosure, in a fifth possible implementation of the first aspect of the embodiments of the present disclosure, the detecting, by the AR device, an environmental parameter of the AR device based on the first image includes:

detecting, by the AR device, a distance c0 between the ranging feature point and a central point of the AR device based on a relative location of the focus of the first image in the first image, and determining an included angle q0 between the device view plane and a line segment corresponding to the distance c0, where the device view plane is a device view plane of the AR device;

photographing, by the AR device, a driver image to obtain a reference image; detecting a first distance c between a driver-eye central point and the central point of the AR device based on a relative location of a driver-eye central point pixel of the reference image in the reference image; and determining an included angle q1 between the device view plane and a line segment corresponding to the first distance c1; and detecting, by the AR device, a second distance c2 between a feature point B' on an upper edge of the front windshield and the central point of the AR device, and an included angle q2 between the device view plane and a line segment corresponding to the second distance c2; and detecting a third distance c3 between a feature point C' on a lower edge of the front windshield and the central point of the AR device, and an included angle q3 between the device view plane and a line segment corresponding to the third distance c3.

With reference to the fifth possible implementation of the first aspect of the embodiments of the present disclosure, in a sixth possible implementation of the first aspect of the embodiments of the present disclosure, the determining, by the AR device, a cropping ratio coefficient of the first image based on the environmental parameter includes:

indicating, by the AR device, the central point of the AR device as an origin O of a two-dimensional coordinate system XOY; indicating, as a straight line L, a straight line that passes through the ranging feature point on the target object and is perpendicular to the device view plane; determining a reference plane of the two-dimensional coordinate system XOY based on the origin O and the straight line L; indicating a projected straight line of the device view plane on the reference plane as an X axis; and setting a direction of the X axis as a direction in which the origin O is away from the straight line L;

indicating, by the AR device, a projected point of the driver-eye central point on the reference plane as a point A in the two-dimensional coordinate system XOY; indicating a projected point of the feature point B' on the reference plane as a point B; indicating a projected point of the feature point C' on the reference plane as a point C; and indicating a projected straight line of a driver view plane on the reference plane as a straight line N, where a projection of the point A on the X axis is a point A1, a projection of the point B on the straight line N is a point B1, a projection of the point B on the X axis is a point B2, a projection of the origin O on the straight line L is a point O1, a projection of the point A on the straight line L is a point A2, an intersection point between a straight line of a line segment OB and the straight line L is a point C1, an intersection point between a straight line of a line segment AB and the straight line L is a point C2, and an intersection point between a straight line of a line segment OC and the straight line L is a point C3;

making, by the AR device, a length of the line segment OA equivalent to the first distance c1; making ∠AOA1 equivalent to the included angle q1; making a length of the line segment OB equivalent to the distance c2; making ∠BOO1 equivalent to the included angle q2; making a length of the line segment OC equivalent to the distance c3; and making ∠COO1 equivalent to the included angle q3; and determining, by the AR device, a length of a line segment OO1 and an expression of the straight line L according to the distance c0 and the included angle q0; determining coordinates of the point A according to the length of the line segment OA and ∠AOA1; determining coordinates of the point B according to the length of the line segment OB and ∠BOO1; determining coordinates of the point C according to the length of the line segment OC and ∠COO1; determining coordinates of the point C2 according to an expression of a straight line passing through the point A and the point B and the expression of the straight line L; determining coordinates of the point C3 according to an expression of a straight line passing through the point C and the origin O and the expression of the straight line L; determining coordinates of the point C1 according to an expression of a straight line passing through the point B and the origin O and the expression of the straight line L; and determining the cropping ratio coefficient of the first image according to the coordinates of the point C1, the coordinates of the point C2, and the coordinates of the point C3.

A second aspect of the embodiments of the present disclosure discloses an AR device, where the AR device includes a memory and a processor coupled to the memory, the memory is configured to store an instruction, and the processor is configured to run the instruction, to perform some or all steps described in any method according to the first aspect of the embodiments of the present disclosure.

A third aspect of the embodiments of the present disclosure discloses a computer-readable storage medium, where the computer-readable storage medium stores program code for execution by an AR device, the program code specifically includes an instruction, and the instruction is used to perform some or all steps described in any method according to the first aspect of the embodiments of the present disclosure.

A fourth aspect of the embodiments of the present disclosure discloses an AR device, where the AR device includes a functional unit, and the functional unit is configured to perform some or all steps described according to any method in the first aspect of the embodiments of the present disclosure.

In some possible implementations, after the AR device displays the AR image on the front windshield of the car, the AR device may further perform the following operations:

obtaining, by the AR device, association information of the target object, and displaying the association information at a first preset location on the front windshield of the car, where the association information includes at least identity information and type information of the target object; or obtaining, by the AR device, navigation information associated with the target object, and displaying the association information at a second preset location on the front windshield of the car.

In some possible implementations, the target object may include various objects or pedestrians that may appear within the line of sight of the driver in a driving process, for example, a road sign, a building, a car, and an isolation belt.

In the embodiments of the present disclosure, first, the AR device obtains the first image including the image of the target object, and detects the environmental parameter of the AR device based on the first image. Next, the AR device determines the cropping ratio coefficient of the first image based on the environmental parameter. Further, the AR device crops the first image based on the cropping ratio coefficient, to obtain the second image. Afterwards, the AR device extracts the M contour feature points in the remaining image of the target object from the second image, to generate the AR image of the target object. Finally, the AR device displays the AR image on the front windshield of the car. It can be learned that the AR device provided in the embodiments of the present disclosure can generate the AR image of the target object, and display the generated AR image on the front windshield of the car, so as to help the driver comprehensively and clearly obtain the dynamic status of the environment within the line of sight, so that driving safety is improved.

BRIEF DESCRIPTION OF DRAWINGS

To describe the technical solutions in the embodiments of the present disclosure more clearly, the following briefly describes the accompanying drawings required for describing the embodiments. Apparently, the accompanying drawings in the following description show merely some embodiments of the present disclosure, and persons of ordinary skill in the art may still derive other drawings from these accompanying drawings without creative efforts.

FIG. 1.1 is a functional block diagram of an example vehicle 100 according to an embodiment of the present disclosure;

FIG. 1.2 is a schematic diagram of an application scenario of an AR device according to an embodiment of the present disclosure;

FIG. 4A and FIG. 4B show an image information processing method according to a second method embodiment of the present disclosure;

FIG. 4.1 is a schematic diagram of an equivalent two-dimensional coordinate system XOY in an example application scenario according to an embodiment of the present disclosure;

FIG. 4.2 is a schematic diagram of a feature point, in a two-dimensional coordinate system XOY, that is on a target object and is corresponding to a contour feature point according to an embodiment of the present disclosure;

FIG. 5A and FIG. 5B show an image information processing method according to a third method embodiment of the present disclosure;

FIG. 6A and FIG. 6B show an image information processing method according to a fourth method embodiment of the present disclosure.

DESCRIPTION OF EMBODIMENTS

The following clearly describes the technical solutions in the embodiments of the present disclosure with reference to the accompanying drawings in the embodiments of the present disclosure. Apparently, the described embodiments are merely some but not all of the embodiments of the present disclosure. All other embodiments obtained by persons of ordinary skill in the art based on the embodiments of the present disclosure without creative efforts shall fall within the protection scope of the present disclosure.

The following describes in detail various features and functions of a disclosed system and method with reference to the accompanying drawings. In the accompanying drawings, similar symbols identify similar components unless otherwise stated in a context. Illustrative system and method embodiments described in this specification are not uniquely limited. It should be understood that some aspects of the disclosed system and method may be arranged and combined according to multiple different configurations. All of these are considered in this specification.

Figure 1:
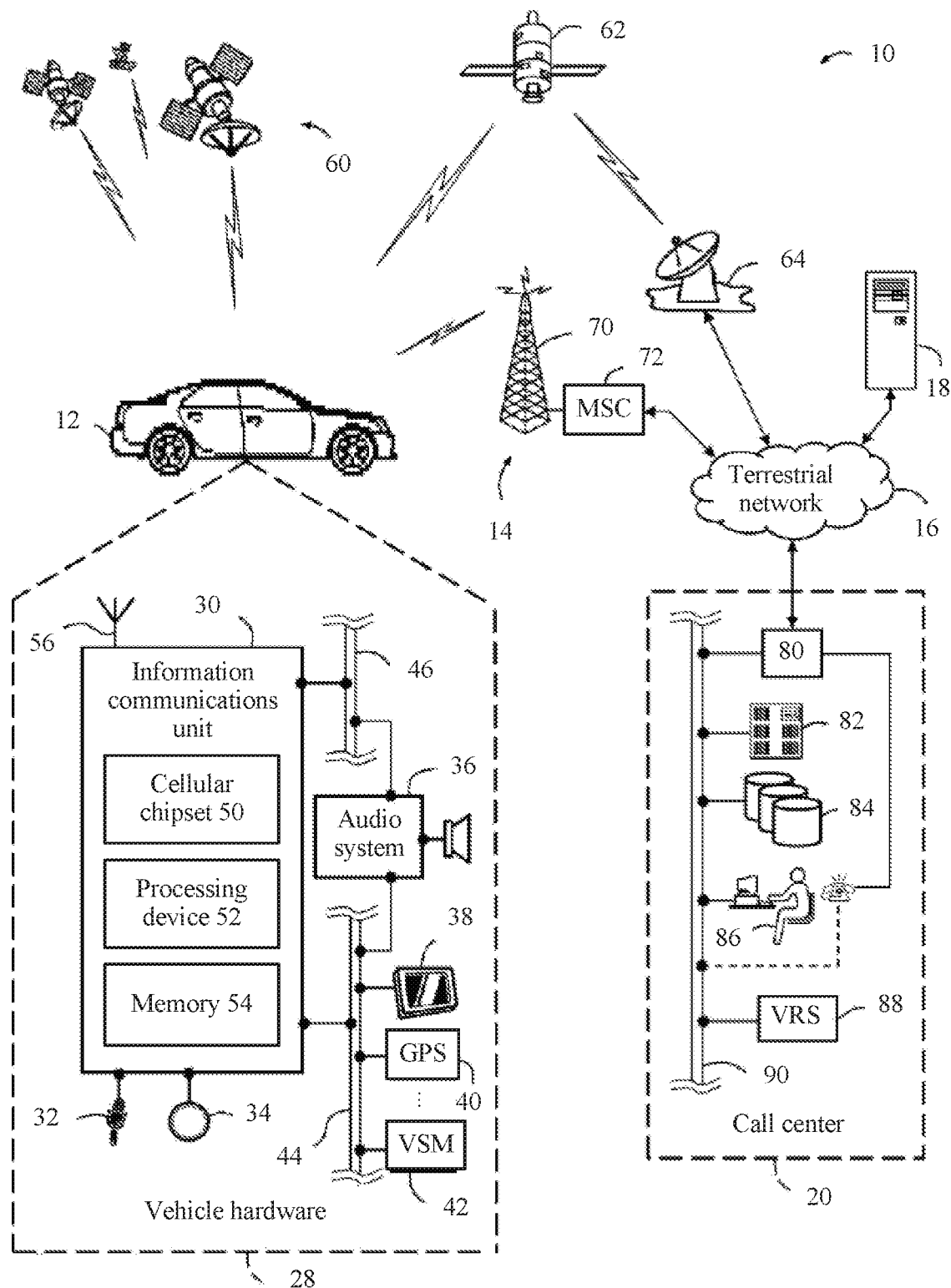
FIG. 1 is a system architectural diagram of a mobile vehicle communications system according to an embodiment of the present disclosure.

Referring to FIG. 1, FIG. 1 is a system architectural diagram of a mobile vehicle communications system according to an embodiment of the present disclosure. A communications system 10 includes a vehicle 12, one or more wireless carrier systems 14, a terrestrial communications network 16, a computer 18, and a call center 20. It should be understood that a disclosed method can be used together with any quantity of different systems, and is not specifically limited to an operating environment shown herein. Likewise, an architecture, construction, a setting, and an operation of the system 10 and individual components of the system 10 are generally known in the prior art. Therefore, the following paragraphs simply provide only an overview of an example of the communications system 10. The disclosed method can also be used in another system that is not shown in this specification.

The vehicle 12 may be implemented in a car or may be in a form of a car. However, the example system may also be implemented on another vehicle or be in a form of another vehicle, for example, another vehicle such as a sedan, a truck, a motorcycle, a bus, a ship, an airplane, a helicopter, a lawnmower, a snowplow, a utility vehicle, an amusement ride, agricultural equipment, construction equipment, a tramcar, a golf cart, a train, and a trolley. In addition, a robotic apparatus may be configured to perform the method and the system that are described in this specification.

Some vehicle electronic components 28 are shown in FIG. 1, and include an information communications unit 30, a microphone 32, one or more buttons or other control inputs 34, an audio system 36, a visual display 38, a Global Positioning System (GPS) module 40, and multiple Vehicle Security Module or vehicle system module (VSMs) 42. Some of these devices can be directly connected to the information communications unit, for example, the microphone 32 and the buttons 34. Other devices are indirectly connected by using one or more network connections, for example, a communications bus 44 or an entertainment bus 46. An example of a suitable network connection includes a controller area network (CAN), Media Oriented Systems Transport (MOST), a local interconnect network (LIN), a local area network (LAN), and another suitable connection, such as the Ethernet or another connection that conforms to known International Organization for Standardization (ISO), Society of Automotive Engineers (SAE), and Institute of Electrical and Electronics Engineers (IEEE) standards and specifications. Only a small part is enumerated herein.

The information communications unit 30 may be an original equipment manufacturer (OEM) installed (built-in) or accessory market device. The information communications unit 30 is installed in the vehicle, and can perform wireless voice and/or data communication in the wireless carrier system 14 by means of wireless networking, so that the vehicle can communicate with the call center 20, another information communication-enabled vehicle, or some other entities or devices. The information communications unit preferably establishes a communications channel (a voice channel and/or a data channel) with the wireless carrier system 14 by means of radio broadcasting, so that voice and/or data transmission can be sent and received on the channel. By providing voice and data communication, the information communications unit 30 enables the vehicle to provide multiple different services, which include those services associated with navigation, telephony, emergency assistance, diagnosis, infotainment, and the like. Data can be sent by using a data connection (for example, by using packet data transmission on a data channel, or by using a voice channel using a technology known in the prior art). For a combined service that includes both voice communication (for example, with a live advisor or a voice response unit at the call center 20) and data communication (for example, providing GPS location data or vehicle diagnostic data for the call center 20), the system may perform a switchover between voice transmission and data transmission on the voice channel according to a requirement by using a single call on the voice channel. This may be completed by using a technology known to persons skilled in the art. In addition, data (for example, a packet data protocol (PDP)) may be sent and received by using a short message service (SMS). The information communications unit may be configured to be mobile terminated and/or initiated, or may be configured to be application terminated and/or initiated.

The information communications unit 30 uses cellular communication according to a Global System for Mobile Communications (GSM) standard or a Code Division Multiple Access (CDMA) standard, and therefore, includes a standard cellular chipset 50 for voice communication (such as hands-free calling), a wireless modem for data transmission, an electronic processing device 52, one or more digital memory devices 54, and a dual antenna 56. It should be understood that the modem can be implemented by using software that is stored in the information communications unit and is executed by the processor 52, or the modem can be a separate hardware component located inside or outside the information communications unit 30. The modem can operate by using any quantity of different standards or protocols (such as EVDO (CDMA20001×EV-DO, EVDO), CDMA, general packet radio service (GPRS) technology, and Enhanced Data Rates for GSM Evolution (EDGE) technology). Wireless networking between the vehicle and another networked device can also be performed by using the information communications unit 30. For this purpose, the information communications unit 30 can be configured to perform wireless communication according to one or more wireless protocols (such as any one of the IEEE 802.11 protocol, Worldwide Interoperability for Microwave Access (WiMAX), or BLUETOOTH). When the information communications unit is configured to perform packet switched data communication such as Transmission Control Protocol/Internet Protocol (TCP/IP) communication, the information communications unit can be configured with a static IP address, or can be configured to automatically receive an assigned IP address from another device (such as a router) in a network or from a network address server.

The processor 52 may be any type of device that can process an electronic instruction, including a microprocessor, a micro controller, a main processor, a controller, a vehicle communication processor, and an application-specific integrated circuit (ASIC). The processor 52 can be a dedicated processor that is used only in the information communications unit 30 or that can be shared with another vehicle system. The processor 52 executes various types of digitally-stored instructions, such as a software or firmware program stored in the memory 54, to enable the information communications unit to provide a wide variety of services. For example, the processor 52 can execute a program or process data, to execute at least a part of the method discussed in this specification.

The information communications unit 30 can be configured to provide a diverse range of vehicle services including wireless communication to and/or from the vehicle. Such services include: turn-by-turn directions turn-by-turn directions and another navigation-related service that is provided in combination with the GPS-based vehicle navigation module 40; an airbag deployment notification and another emergency or roadside assistance-related service that is provided in combination with one or more collision sensor interface modules (such as a main control module (not shown in the figure)); a diagnostic report obtained by using one or more diagnostic modules; and an infotainment-related service. Music, a web page, a movie, a television program, a video game, and/or other information are/is downloaded by an infotainment module and stored for current or later playback. The services listed above are by no means an exhaustive list of all capabilities of the information communications unit 30, but are only an enumeration of some services that the information communications unit can provide. In addition, it should be understood that at least some of the foregoing modules can be implemented in a form of a software instruction stored inside or outside the information communications unit 30. The modules may be hardware components located inside or outside the information communications unit 30; or the modules may be integrated into and/or shared with each other, or integrated into and/or shared with another system located in the entire vehicle. Only several possibilities are enumerated. When the modules are implemented as the VSMs 42 located outside the information communications unit 30, the modules may exchange data and a command with the information communications unit by using the communications bus 44.

The GPS module 40 receives a radio signal from a constellation 60 of a GPS satellite. The module 40 can determine a location of the vehicle according to the signal. The location of the vehicle is used to provide a vehicle driver with a navigation service and another location-related service. Navigation information can be presented on the display 38 (or another display within the vehicle) or can be presented verbally, for example, when turn-by-turn navigation is provided. The navigation service can be provided by using a dedicated navigation module (which may be a part of the GPS module 40) in the vehicle, or some or all navigation services may be completed by using the information communications unit 30. Location information is sent to a remote location, to provide the vehicle with a navigation map, a map annotation (a point of interest, a restaurant, and the like), route calculation, and the like. The location information can be provided for the call center 20 or another remote computer system such as the computer 18 for another purpose, such as fleet management. In addition, new or updated map data can be downloaded from the call center 20 to the GPS module 40 by using the information communications unit 30.

In addition to the audio system 36 and the GPS module 40, the vehicle 12 can include other vehicle system modules VSMs 42 in a form of electronic hardware components. The other vehicle system modules VSMs 42 are located in the entire vehicle, usually receive an input from one or more sensors, and perform a diagnostic function, a monitoring function, a control function, a reporting function, and/or another function by using the sensed input. Each of the VSMs 42 is preferably connected to another VSM and the information communications unit 30 by using the communications bus 44, and can be programmed to run a vehicle system and subsystem diagnostic test. For example, one VSM 42 can be an engine control module (ECM) that controls various aspects (such as fuel ignition and an ignition time point) of an engine operation. Another VSM 42 can be a powertrain system control module that regulates an operation of one or more components of a powertrain system in the vehicle, and the another VSM 42 can be a main control module that manages various electronic components (like power door locks and headlights of the vehicle) located in the entire vehicle. According to an embodiment, the engine control module is equipped with an onboard diagnostics (OBD) feature. The OBD feature provides a large amount of real-time data such as data received from various sensors (including a vehicle emission sensor), and provides a standardized series of diagnostic trouble codes (DTC). The diagnostic trouble code allows skilled persons to quickly identify and remedy a malfunction within the vehicle. It is understood by persons skilled in the art that the above-mentioned VSMs are only examples of some modules that may be used in the vehicle 12, and many other modules are also possible.

The vehicle electronic components 28 further include multiple vehicle user interfaces, to provide a vehicle occupant with an apparatus for providing and/or receiving information, and the apparatus includes the microphone 32, the buttons 34, the audio system 36, and the visual display 38. As used in this specification, the term "vehicle user interface" broadly includes an electronic device in any suitable form, and the electronic device includes a hardware component and a software component. The electronic device is located in the vehicle, and enables a vehicle user to communicate with a vehicle component or perform communication by using a vehicle component. The microphone 32 provides an audio input to the information communications unit, to enable the driver or another occupant to provide a voice command and make a hands-free call by using the wireless carrier system 14. For this purpose, the microphone 32 can be connected to an onboard automated voice processing unit, and the onboard automated voice processing unit uses a human machine interface (HMI) technology known in the prior art. The buttons 34 allow a manual user input into the information communications unit 30, to initiate a radiotelephone call and provide another data, response, or control input. A separate button can be configured to initiate an emergency call and a regular service help call to the call center 20. The audio system 36 provides an audio output to the vehicle occupant, and can be a dedicated stand-alone system or a part of a primary vehicle audio system. According to a specific embodiment shown herein, the audio system 36 is operatively connected to the vehicle bus 44 and the entertainment bus 46, and can provide amplitude modulation (AM), frequency modulation (FM) and satellite broadcasting, digital versatile disc (DVD), and other multimedia functions. The function can be provided in combination with the foregoing infotainment module or provided independently. The visual display 38 is preferably a graphics display, such as a touchscreen on a dash board or a head-up display reflected from a windshield, and can be configured to provide multiple input and output functions. Various other vehicle user interfaces can also be used because the interface in FIG. 1 is only an example in a specific implementation solution.

The wireless carrier system 14 is preferably a cellular telephone system, including multiple cellular towers 70 (only one cellular tower is shown), one or more mobile switching center (MSCs) 72, and any other networking component required for connecting the wireless carrier system 14 to the terrestrial network 16. Each cellular tower 70 includes a transmit antenna, a receive antenna, and a base station. Base stations from different cellular towers are directly connected to the MSC 72 or connected to the MSC 72 by using an intermediate apparatus (such as a base station controller). The wireless carrier system 14 may implement any suitable communications technology including, for example, an analog technology (such as an Advanced Mobile Phone System (AMPS)) or a newer digital technology (such as CDMA (such as CDMA2000) or GSM/GPRS). It is to be understood by persons skilled in the art that various cellular tower/base station/MSC settings are possible, and may be used together with the wireless carrier system 14. For example, a base station and a cellular tower can be located at a same location, or a base station and a cellular tower can be located at locations remote from each other. Each base station can respond to a single cellular tower, or a single base station can serve all cellular towers. All base stations can be connected to a single MSC. Only a small part of possible settings is enumerated herein.

In addition to the wireless carrier system 14, different wireless carrier systems in a form of satellite communication can be configured to provide unidirectional or bidirectional communication with the vehicle. This can be completed by using one or more communications satellites 62 and an uplink transmission station 64. Unidirectional communication can be, for example, a satellite broadcasting service. The transmission station 64 receives content of a program (news, music, or the like), packages the content for uploading, and then sends the content to the satellite 62. The satellite 62 broadcasts the program to a user. Bidirectional communication can be, for example, a satellite telephony service in which telephone communication is relayed between the vehicle 12 and the station 64 by using the satellite 62. If the satellite 62 is used, this satellite telephony can be added to the wireless carrier system 14 or be substituted for the wireless carrier system 14 for use.

The terrestrial network 16 may be a conventional terrestrial radio communications network. The terrestrial network 16 is connected to one or more fixed-line phones, and connects the wireless carrier system 14 to the call center 20. For example, the terrestrial network 16 may include a public switched telephone network (PSTN), such as a PSTN used to provide wired telephony, packet switched data communication, and an Internet infrastructure. One or more parts of the terrestrial network 16 can be implemented by using a standard wired network, an optical fiber or another optical network, a cable network, a power line network, another wireless network (such as a wireless local area network (WLAN)), a network that provides broadband wireless access (BWA), or any combination thereof. The terrestrial network 16 may further include one or more short message service center (SMCs) used to store, upload, convert, and/or transmit an SMS between a sender and a receiver. For example, the SMSC may receive an SMS message from the call center 20 or a content provider (such as an external short message entity (ESME)), and the SMSC may transmit the SMS message to the vehicle 12 (such as a mobile terminal device). The SMSC and a function of the SMSC are known to skilled persons. In addition, the call center 20 does not need to be connected by using the terrestrial network 16, but may include a wireless telephone device, so that the call center 20 can directly communicate with a wireless network (such as the wireless carrier system 14).

The computer 18 can be one of multiple computers. The multiple computers can be accessed by using a private or public network (such as the Internet). Each computer 18 can be configured for one or more purposes, for example, a web server that can be accessed by the vehicle by using the information communications unit 30 and the wireless carrier system 14. Another such accessible computer 18 can be, for example, a service center computer in which diagnostic information and other vehicle data can be uploaded from the vehicle by using the information communications unit 30; a client computer used by a vehicle owner or another user for the following purposes such as accessing or receiving vehicle data, or setting or configuring a user parameter, or controlling a vehicle function; or a third-party repository. Vehicle data or other information is provided to or is from the third-party repository by communicating with either the vehicle 12 or the call center 20 or by communicating with both the vehicle 12 and the call center 20. The computer 18 can also be configured to provide an Internet connection, such as a domain name server (DNS) service; or be used as a network address server that assigns an IP address to the vehicle 12 by using a Dynamic Host Configuration Protocol (DHCP) or another suitable protocol.

The call center 20 is designed to provide multiple different system backend functions for the vehicle electronic components 28. In addition, according to the example embodiment shown herein, the call center 20 usually includes one or more switches 80, servers 82, databases 84, live advisors 86, and automatic voice response system (VRSs) 88, and they are all known in the prior art. These call-center components are preferably connected to each other by using a wired or wireless local area network 90. The switch 80 can be a private branch exchange (PBX), and route an incoming signal, so that voice transmission is usually sent to the live advisor 86 by using an ordinary telephone or sent to the automatic voice response system 88 by using Voice over Internet Protocol (VoIP). A live-advisor telephone can also use VoIP indicated by a dashed line in FIG. 1. VoIP and other data communication passing through the switch 80 are implemented by using a modem (not shown in the figure) connected between the switch 80 and the network 90. Data transmission is transferred to the server 82 and/or the database 84 by using the modem. The database 84 can store account information such as user identity authentication information, a vehicle identifier, a data profile (profile) record, a behavior pattern, and other related user information. Alternatively, data transmission may be performed by a wireless system, such as 802.11x and a GPRS. In addition, the SMS may be used to send and/or receive data (such as a PDP), and the call center 20 may be configured to be mobile terminated and/or initiated, or may be configured to be application terminated and/or initiated. Although the illustrated embodiment is described as that the embodiment is used together with the manned call center 20 using the live advisor 86, it is to be understood that the call center may alternatively use the VRS 88 as an automatic advisor, or a combination of the VRS 88 and the live advisor 86 may be used.

FIG. 1.1 is a functional block diagram of an example vehicle 100 according to an embodiment of the present disclosure. Components coupled to the vehicle 100 or included in the vehicle 100 may include a propulsion system 102, a sensor system 104, a control system 106, a peripheral device 108, a power supply 110, a computing apparatus 111, and a user interface 112. The computing apparatus 111 may include a processor 113 and a memory 114. The computing apparatus 111 may be a controller of the vehicle 100 or a part of the controller. The memory 114 may include an instruction 115 that can be executed by the processor 113, and may further store map data 116. The components of the vehicle 100 may be configured to work in a manner of being interconnected to each other and/or being interconnected to other components coupled to respective systems. For example, the power supply 110 may supply power to all the components of the vehicle 100. The computing apparatus 111 may be configured to: receive data from the propulsion system 102, the sensor system 104, the control system 106, and the peripheral device 108, and control them. The computing apparatus 111 may be configured to: generate a display of an image at the user interface 112, and receive an input from the user interface 112.

In another example, the vehicle 100 may include more, fewer, or different systems, and each system may include more, fewer, or different components. In addition, the shown systems and components may be combined or divided in any manner.

The propulsion system 102 may be configured to provide powered motion for the vehicle 100. As shown in the figure, the propulsion system 102 includes an engine/motor 118, an energy source 120, a transmission apparatus (transmission) 122, and wheels/tires 124.

The engine/motor 118 may be or include any combination of an internal combustion engine, an electric motor, a steam engine, a Stirling engine, and the like. Another engine and motor are also possible. In some examples, the propulsion system 102 may include multiple types of engines and/or motors. For example, a gas-electric hybrid car may include a gasoline engine and an electric motor. Another example is possible.

The energy source 120 may be a source of all or some energy that is provided for the engine/motor 118. That is, the engine/motor 118 may be configured to convert the energy source 120 into mechanical energy. Examples of the energy source 120 include gasoline, diesel, other petroleum-based fuel, propane, other compressed gas-based fuel, ethanol, a solar panel, a battery, and other power supply. (One or more) energy sources 120 may additionally or alternatively include any combination of a fuel tank, a battery, a capacitor, and/or a flywheel. In some examples, the energy source 120 may also provide energy for other systems of the vehicle 100.

The transmission apparatus 122 may be configured to transmit mechanical power from the engine/motor 118 to the wheels/tires 124. Therefore, the transmission apparatus 122 may include a gearbox, a clutch, a differential, a drive shaft, and/or another element. In an example that the transmission apparatus 122 includes a drive shaft, the drive shaft includes one or more axles that are configured to be coupled to the wheels/tires 124.

The wheels/tires 124 of the vehicle 100 may be configured in various forms including a unicycle form, a bicycle/motorcycle form, a tricycle form, or a four-wheel car/truck form. Another wheel/tire form is also possible, such as a form of six or more wheels. The wheels/tires 124 of the vehicle 100 may be configured to differentially rotate with respect to other wheels/tires 124. In some examples, the wheels/tires 124 may include at least one wheel fixedly attached to the transmission apparatus 122 and at least one tire that is coupled to a rim of the wheel and that is in contact with a driving surface. The wheels/tires 124 may include any combination of metal and rubber, or a combination of other materials.

The propulsion system 102 may additionally or alternatively include a component other than those shown.

The sensor system 104 may include several sensors configured to sense information about an environment in which the vehicle 100 is located. As shown in the figure, the sensors in the sensor system include a GPS 126, an inertial measurement unit (IMU) 128, a radio detection and ranging (RADAR) unit 130, a light detection and ranging (LIDAR) unit 132, a camera 134, and an actuator 136 configured to modify locations and/or orientations of the sensors. The sensor system 104 may also include an additional sensor including, for example, a sensor (such as an $O_2$ monitor, a fuel gauge, and an engine oil temperature) that monitors an internal system of the vehicle 100. The sensor system 104 may also include another sensor.

The GPS module 126 may be any sensor configured to estimate a geographic location of the vehicle 100. Therefore, the GPS module 126 may include a transceiver that is used to estimate a location of the vehicle 100 relative to the earth based on satellite positioning data. In an example, the computing apparatus 111 may be configured to estimate, in combination with the map data 116 by using the GPS module 126, a location of a lane boundary on a road on which the vehicle 100 may travel. The GPS module 126 may also be in another form.

The IMU 128 may be configured to sense a location change and an orientation change of the vehicle 100 based on an inertial acceleration and any combination thereof. In some examples, a combination of sensors may include, for example, an accelerometer and a gyroscope. Another combination of sensors is also possible.

The RADAR unit 130 may be considered as an object detection system. The object detection system is configured to detect a characteristic of an object by using a radio wave, for example, a distance, an altitude, a direction, or a speed of the object. The RADAR unit 130 may be configured to transmit a pulse of a radio wave or a microwave, and the pulse may bounce off any object in a path of the wave. The object may return partial energy of the wave to a receiver (such as a dish antenna or an antenna). The receiver may also be a part of the RADAR unit 130. The RADAR unit 130 may also be configured to perform digital signal processing on a received signal (bouncing off the object), and may be configured to identify the object.

Another system similar to RADAR has been used in another part of an electromagnetic spectrum. An example is LIDAR, and in LIDAR, visible light from a laser instead of a radio wave may be used.

The LIDAR unit 132 includes a sensor. The sensor senses or detects, by using light, an object in the environment in which the vehicle 100 is located. Generally, LIDAR is an optical remote sensing technology in which a distance to a target or another attribute of a target can be measured by illuminating the target by using light. In an example, the LIDAR unit 132 may include a laser source and/or a laser scanner that are/is configured to emit a laser pulse, and a detector configured to receive a reflection of the laser pulse. For example, the LIDAR unit 132 may include a laser rangefinder reflected by a rotating mirror, and scan a laser around a digitized scene in one or two dimensions, to collect a distance measurement value at a specified angle interval. In an example, the LIDAR unit 132 may include components such as a light (such as laser) source, a scanner, an optical system, components like an optical detector and a receiver electronic component, and a location and navigation system.

In an example, the LIDAR unit 132 may be configured to image an object by using ultraviolet (UV) light, visible light, or infrared light, and may be used for a wide range of targets including a non-metallic object. In an example, a narrow laser beam may be used to map physical features of an object with high resolution.

In an example, a wavelength in a range from approximately 10 micrometers (infrared) to approximately 250 nanometers (UV) can be used. Light is generally reflected via backscattering. Scattering of different types is used for different LIDAR applications, such as Rayleigh scattering, Mie scattering, Raman scattering, and fluorescence. In an example, based on backscattering of different types, LIDAR may be accordingly referred to as Rayleigh laser RADAR, Mie LIDAR, Raman LIDAR, and sodium/iron/potassium fluorescence LIDAR. A suitable combination of wavelengths may allow remote mapping of an object, for example, by searching for a wavelength-dependent change in strength of a reflected signal.

Three-dimensional (3D) imaging may be implemented by using both a scanning LIDAR system and a non-scanning LIDAR system. "3D gated viewing laser RADAR (3D gated viewing laser radar)" is an example of a non-scanning laser ranging system to which a pulse laser and a fast gated camera are applied. Imaging LIDAR may also be performed by using a high-speed detector array and a modulation sensitive detector array that are usually built on a single chip by using a commonly-used complementary metal-oxide-semiconductor (CMOS) and charge coupled device (CCD) manufacturing technology. In these apparatuses, each pixel may be partially processed by means of high-speed demodulation or gating, so that the array can be processed to represent an image from the camera. Thousands of pixels may be simultaneously obtained by using this technology, to create a 3D point cloud that represents an object or a scene that is detected by the LIDAR unit 132.

A point cloud may include a set of vertices in a 3D coordinate system. The vertices may be defined, for example, by X, Y, and Z coordinates, and may represent an external surface of an object. The LIDAR unit 132 may be configured to create the point cloud by measuring a large quantity of points on the surface of the object, and may output the point cloud as a data file. As a result of a process in which the LIDAR unit 132 performs 3D scanning on the object, the point cloud may be used to identify and visualize the object.

In an example, the point cloud may be directly rendered to visualize the object. In another example, the point cloud may be converted into a polygon or triangle mesh model by using a process that may be referred to as surface reconstruction. Example technologies used to convert a point cloud into a 3D surface may include Delaunay triangulation, alpha shapes, and ball pivoting. The technologies include building a network of triangles over existing vertices of the point cloud. Another example technology may include: converting a point cloud into a volumetric distance field and reconstructing, by using a marching cubes algorithm, an implicit surface defined in this manner.

The camera 134 may be any camera (such as a still camera or a video camera) configured to obtain an image of the environment in which the vehicle 100 is located. Therefore, the camera may be configured to detect visible light, or may be configured to detect light from another part (such as infrared light or ultraviolet light) of a spectrum. A camera of another type is also possible. The camera 134 may be a two-dimensional detector, or may have a three-dimensional spatial range. In some examples, the camera 134 may be, for example, a distance detector, configured to generate a two-dimensional image indicating a distance from the camera 134 to several points in the environment. Therefore, the camera 134 may use one or more distance detection technologies. For example, the camera 134 may be configured to use a structured light technology. In the technology, the vehicle 100 illuminates an object in the environment by using a predetermined light pattern, such as a grid or checkerboard pattern, and uses the camera 134 to detect a reflection of the predetermined light pattern from the object. Based on a distortion in the reflected light pattern, the vehicle 100 may be configured to detect a distance to a point on the object. The predetermined light pattern may include infrared light, or light of another wavelength.

For example, the actuator 136 may be configured to modify a location and/or an orientation of the sensor. The sensor system 104 may additionally or alternatively include a component other than those shown.

The control system 106 may be configured to control operations of both the vehicle 100 and the components of the vehicle 100. Therefore, the control system 106 may include a steering unit 138, a throttle 140, a brake unit 142, a sensor fusion algorithm 144, a computer vision system 146, a navigation or pathing (pathing) system 148, and an obstacle avoidance system 150.

The steering unit 138 may be any combination of mechanisms configured to adjust a heading direction or a direction of the vehicle 100.

The throttle 140 may be any combination of mechanisms configured to control an operation speed and an acceleration of the engine/motor 118, so as to control a speed and an acceleration of the vehicle 100.

The brake unit 142 may be any combination of mechanisms configured to decelerate the vehicle 100. For example, the brake unit 142 may slow down the wheels/tires 124 by using friction. In another example, the brake unit 142 may be configured to be regenerative (regenerative) and convert kinetic energy of the wheels/tires 124 into a current. The brake unit 142 may also be in another form.

The sensor fusion algorithm 144 may include, for example, an algorithm (or a computer program product storing an algorithm) that can be executed by the computing apparatus 111. The sensor fusion algorithm 144 may be configured to receive data from the sensor 104 as an input. The data may include, for example, data that represents information sensed at the sensor of the sensor system 104. The sensor fusion algorithm 144 may include, for example, a Kalman filter, a Bayesian network, or another algorithm. The sensor fusion algorithm 144 may be further configured to provide various assessments based on the data from the sensor system 104, and the assessments include, for example, an evaluation of an individual object and/or a feature in the environment in which the vehicle 100 is located, an evaluation of a specific situation, and/or an evaluation of possible impact based on a particular situation. Other assessments are also possible.

The computer vision system 146 may be any system configured to process and analyze an image captured by the camera 134, to identify an object and/or a feature in the environment in which the vehicle 100 is located. The object and/or the feature include/includes, for example, lane information, a traffic signal, and an obstacle. Therefore, the computer vision system 146 may use an object identification algorithm, a structure from motion (SFM) algorithm, video tracking, or another computer vision technology. In some examples, the computer vision system 146 may be additionally configured to: map an environment, track an object, estimate a speed of an object, and so on.

The navigation and pathing system 148 may be any system configured to determine a driving route for the vehicle 100. The navigation and pathing system 148 may be additionally configured to dynamically update the driving route while the vehicle 100 is in operation. In some examples, the navigation and pathing system 148 may be configured to combine data from the sensor fusion algorithm 144, the GPS module 126, and one or more predetermined maps, to determine the driving route for the vehicle 100.

The obstacle avoidance system 150 may be any system configured to identify, evaluate, and avoid or otherwise negotiate an obstacle in the environment in which the vehicle 100 is located.

The control system 106 may additionally or alternatively include a component other than those shown.

The peripheral device 108 may be configured to allow the vehicle 100 to interact with an external sensor, another vehicle, and/or a user. Therefore, the peripheral device 108 may include, for example, a wireless communications system 152, a touchscreen 154, a microphone 156, and/or a loudspeaker 158.

The wireless communications system 152 may be any system configured to be wirelessly coupled to one or more other vehicles, sensors, or other entities directly or by using a communications network. Therefore, the wireless communications system 152 may include an antenna and a chipset that are used to communicate with the other vehicles, the sensors, or the other entities directly or by using an air interface. The chipset or the entire wireless communications system 152 may be configured to perform communication according to one or more other types of wireless communication (such as protocols). Wireless communication is, for example, Bluetooth, a communication protocol described in IEEE 802.11 (including any IEEE 802.11 revision), a cellular technology (such as GSM, CDMA, Universal Mobile Telecommunications System (UMTS), EV-DO, WiMAX or Long Term Evolution (LTE)), Zigbee, dedicated short range communications (DSRC), and radio frequency identification (RFID) communication. The wireless communications system 152 may also be in another form.

The touchscreen 154 may be used by the user to enter a command to the vehicle 100. Therefore, the touchscreen 154 may be configured to sense at least one of a location or a movement of a finger of the user by means of capacitive sensing, resistance sensing, a surface acoustic wave process, or the like. The touchscreen 154 may be capable of sensing a finger movement in a direction that is parallel to a touchscreen surface or is on a same plane as a touchscreen surface, in a direction perpendicular to a touchscreen surface, or in both directions, and may also be capable of sensing a level of pressure applied to the touchscreen surface. The touchscreen 154 may be formed by one or more translucent or transparent insulation layers and one or more translucent or transparent conducting layers. The touchscreen 154 may also be in another form.

The microphone 156 may be configured to receive audio (such as a voice command or another audio input) from the user of the vehicle 100. Similarly, the loudspeaker 158 may be configured to output audio to the user of the vehicle 100.

The peripheral device 108 may additionally or alternatively include a component other than those shown.

The power supply 110 may be configured to supply power to some or all components of the vehicle 100. Therefore, the power supply 110 may include, for example, a rechargeable lithium-ion or lead-acid battery. In some examples, one or more battery groups may be configured to supply power. Another power supply material and configuration are also possible. In some examples, the power supply 110 and the energy source 120 may be implemented together, as in some all-electric cars.

The processor 113 included in the computing apparatus 111 may include one or more general-purpose processors and/or one or more dedicated processors (such as an image processor and a digital signal processor). For that the processor 113 includes more than one processor, such processors may work separately or work in combination. The computing apparatus 111 may implement a function of controlling the vehicle 100 based on an input received by using the user interface 112.

Further, the memory 114 may include one or more volatile storage components and/or one or more non-volatile storage components, such as an optical storage apparatus, a magnetic storage apparatus, and/or an organic storage apparatus, and the memory 114 may be integrated with the processor 113 in whole or in part. The memory 114 may include the instruction 115 (such as program logic) that can be executed by the processor 113, to execute various vehicle functions including any one of the functions or methods described in this specification.

The components of the vehicle 100 may be configured to work in a manner of being interconnected with other components inside and/or outside their respective systems. Therefore, the components and systems of the vehicle 100 may be communicatively linked together by using a system bus, a network, and/or another connection mechanism.

Based on architectures of the mobile vehicle communications system 10 and the example vehicle 100, referring to FIG. 1.2, FIG. 1.2 is a schematic diagram of an application scenario of an AR device according to an embodiment of the present disclosure. An AR device 100, a driver in a cab, a front windshield 200 of a car, and a target object 300 in front of the car are included. The AR device 100 is disposed between the front windshield 200 of the car and the driver. A device view plane of the AR device 100 is lower than a driver view plane. The AR device is disposed on a center console of the car.

Figure 2:
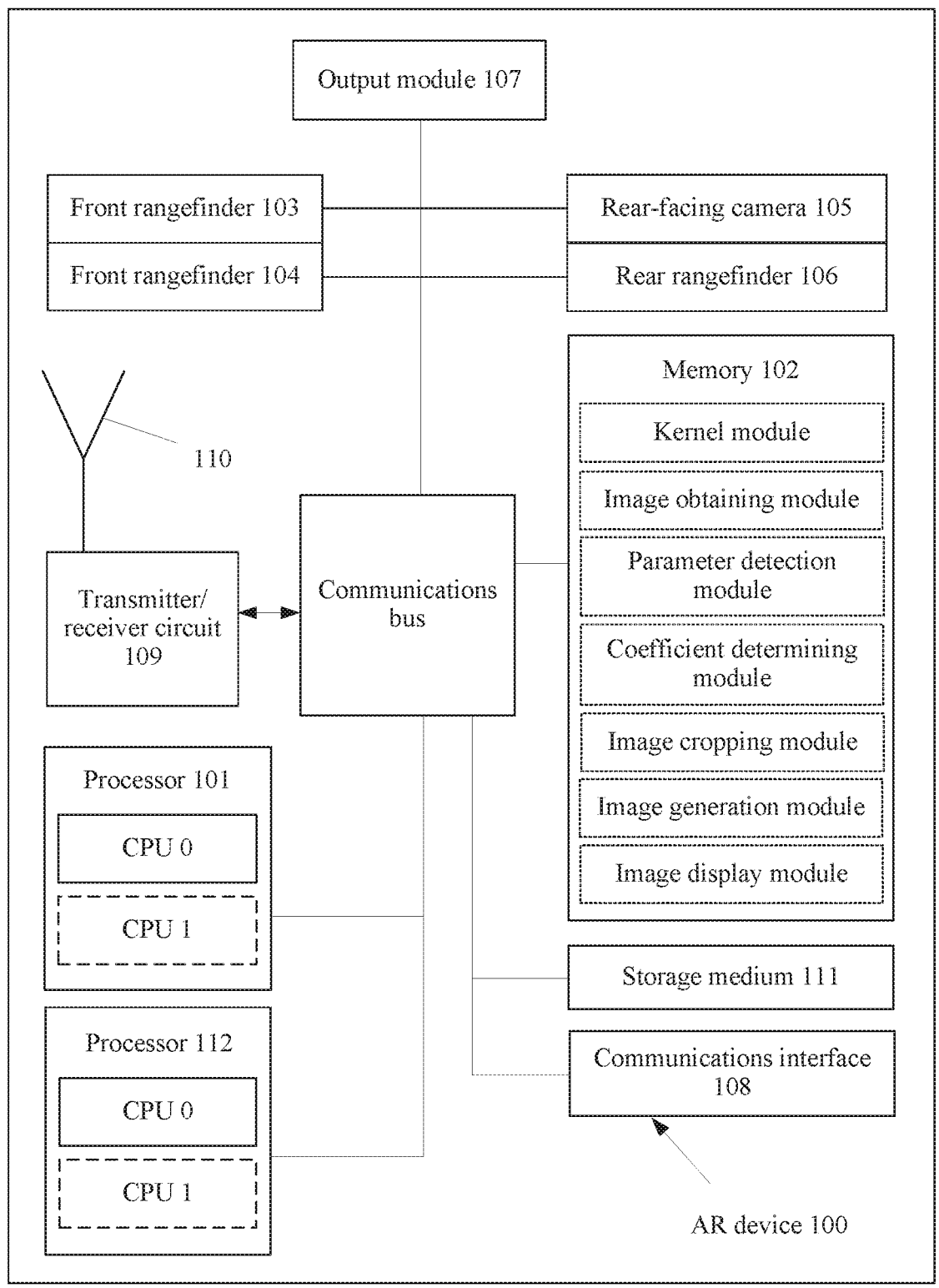
FIG. 2 is a schematic structural diagram of an AR device 100 according to an embodiment of the present disclosure.

Further, referring to FIG. 2, FIG. 2 is a schematic structural diagram of an AR device 100 according to an embodiment of the present disclosure.

As shown in FIG. 2, the AR device 100 includes a processor 101. The processor 101 may be coupled to one or more storage mediums. The storage mediums include a storage medium 111 and at least one memory 102. The storage medium 111 may be read only, for example, a read-only memory (ROM) or a readable/writable hard disk or flash memory. The memory 102 may be, for example, a random access memory (RAM). The memory 102 may be combined with the processor 101 or integrated into the processor 101, or may include an independent unit or multiple units. The processor 101 is a control center of the AR device 100, and specifically provides a time sequence and a process device that are used to execute an instruction, complete an interrupted event, and provide a time function and many other functions. Optionally, the processor 101 includes one or more central processing units (CPUs), such as a CPU 0 and a CPU 1 in FIG. 2. Optionally, the AR device 100 may include multiple processors, such as the processor 101 and a processor 112 shown in FIG. 2. Each processor may be a single-core or multi-core processor. Unless otherwise specified, a specific implementation of the processor or memory described in the present disclosure includes a general-purpose component or a dedicated component. The general-purpose component is configured to execute a task at a particular moment. The dedicated component is produced to execute a dedicated task. The processor described in this embodiment of the present disclosure includes at least an electronic device, a circuit, and/or a processor chip configured to process data (such as a computer program instruction). Program code executed by the processor 101 and/or the processor 112 or by a single CPU in the processor 101 and/or the processor 112 may be stored in the memory 102 or the storage medium 111.

Further, the AR device 100 further includes a front-facing camera 103, a front rangefinder 104, a rear-facing camera 105, a rear rangefinder 106, an output module 107 (such as an optical projector or a laser projector), and/or a communications interface 108. The front-facing camera 103, the front rangefinder 104, the rear-facing camera 105, the rear rangefinder 106, and the output module 107 are coupled to the processor 101. In addition, the AR device 100 may include a receiver/transmitter circuit 109 and an antenna 110. The receiver/transmitter circuit 109 and the antenna 110 are configured to connect the AR device to an external network. Composition units of the AR device 100 may be coupled to each other by using a communications bus. The communications bus includes at least any one of the following buses: a data bus, an address bus, a control bus, an extended bus, and a local bus. It should be noted that the AR device 100 is only an example physical apparatus form disclosed in this embodiment of the present disclosure, and a specific form of the AR device is not uniquely limited in this embodiment of the present disclosure.

The processor 101 of the AR device 100 can be coupled to the at least one memory 102. The memory 102 pre-stores program code. The program code specifically includes an image obtaining module, a parameter detection module, a coefficient determining module, an image cropping module, an image generation module, and an image display module. The memory 102 further stores a kernel module. The kernel module includes an operating system (such as WINDOWS™, ANDROID™, or IOS™).

The processor 101 of the AR device 100 is configured to invoke the program code, to perform an image information processing method disclosed in this embodiment of the present disclosure. The method specifically includes the following steps.

The processor 101 of the AR device 100 runs the image obtaining module stored in the memory 102, so as to obtain a first image including an image of a target object 300. The AR device is disposed on a center console of a car. The target object 300 is located in front of the car.

The processor 101 of the AR device 100 runs the parameter detection module stored in the memory 102, so as to detect an environmental parameter of the AR device based on the first image.

The processor 101 of the AR device 100 runs the coefficient determining module stored in the memory 102, so as to determine a cropping ratio coefficient of the first image based on the environmental parameter.

The processor 101 of the AR device 100 runs the image cropping module stored in the memory 102, so as to crop the first image based on the cropping ratio coefficient, to obtain a second image.

The processor 101 of the AR device 100 runs the image generation module stored in the memory 102, so as to extract M contour feature points in a remaining image of the target object 300 from the second image, to generate an AR image of the target object 300, where M is a positive integer.

The processor 101 of the AR device 100 runs the image display module stored in the memory 102, so as to display the AR image on a front windshield 200 of the car.

Optionally, a specific implementation in which the processor 101 displays the AR image on the front windshield 200 of the car is: adding the AR image to a third image according to locations of the M contour feature points in the second image, where the third image is a blank image, and a size of the third image matches a size of the second image; determining a projection angle of the AR image based on the contour feature points in the AR image and the environmental parameter; and projecting the third image on the front windshield 200 according to the projection angle.

It can be learned that in this embodiment of the present disclosure, first, the AR device obtains the first image including the image of the target object, and detects the environmental parameter of the AR device based on the first image. Next, the AR device determines the cropping ratio coefficient of the first image based on the environmental parameter. Further, the AR device crops the first image based on the cropping ratio coefficient, to obtain the second image. Afterwards, the AR device extracts the M contour feature points in the remaining image of the target object from the second image, to generate the AR image of the target object. Finally, the AR device displays the AR image on the front windshield of the car. It can be learned that the AR device provided in this embodiment of the present disclosure can generate the AR image of the target object, and display the generated AR image on the front windshield of the car, so as to help a driver comprehensively and clearly obtain a dynamic status of an environment within a line of sight, so that driving safety is improved.

Optionally, a specific implementation in which the processor 101 displays the AR image on the front windshield 200 of the car is: determining a projection angle of the AR image based on the contour feature points in the AR image and the environmental parameter; and projecting the AR image on the front windshield 200 according to the projection angle.

Optionally, the front windshield 200 includes a display screen, and a specific implementation in which the processor 101 displays the AR image on the front windshield 200 of the car is: determining locations of M projected points that are corresponding to the M contour feature points and are on the front windshield 200; and displaying the AR image on the display screen of the front windshield 200 based on the locations of the M projected points. The front windshield 200 is the display screen.

Optionally, a specific implementation in which the processor 101 obtains the first image including the image of the target object 300 is: photographing the target object 300 by using a ranging feature point on the target object 300 as a focusing reference point, to obtain the first image. A pixel that is in the first image and is corresponding to the focusing reference point is a focus of the first image.

Optionally, a specific implementation in which the processor 101 detects the environmental parameter of the AR device 100 based on the first image is: detecting a distance c0 between the ranging feature point and a central point of the AR device 100 based on a relative location of the focus of the first image in the first image, and determining an included angle q0 between the device view plane and a line segment corresponding to the distance c0, where the device view plane is a device view plane of the AR device 100;

photographing a driver image to obtain a reference image; detecting a first distance c1 between a driver-eye central point and the central point of the AR device 100 based on a relative location of a driver-eye central point pixel of the reference image in the reference image; and determining an included angle q1 between the device view plane and a line segment corresponding to the first distance c1; and detecting a second distance c2 between a feature point B' on an upper edge of the front windshield 200 and the central point of the AR device 100, and an included angle q2 between the device view plane and a line segment corresponding to the second distance c2; and detecting a third distance c3 between a feature point C' on a lower edge of the front windshield 200 and the central point of the AR device 100, and an included angle q3 between the device view plane and a line segment corresponding to the third distance c3.

Optionally, a specific implementation in which the processor 101 determines the cropping ratio coefficient of the first image based on the environmental parameter is: indicating the central point of the AR device 100 as an origin O of a two-dimensional coordinate system XOY; indicating, as a straight line L, a straight line that passes through the ranging feature point on the target object 300 and is perpendicular to the device view plane; determining a reference plane of the two-dimensional coordinate system XOY based on the origin O and the straight line L; indicating a projected straight line of the device view plane on the reference plane as an X axis; and setting a direction of the X axis as a direction in which the origin O is away from away from the straight line;

indicating a projected point of the driver-eye central point on the reference plane as a point A in the two-dimensional coordinate system XOY; indicating a projected point of the feature point B' on the reference plane as a point B; indicating a projected point of the feature point C' on the reference plane as a point C; and indicating a projected straight line of a driver view plane on the reference plane as a straight line N, where a projection of the point A on the X axis is a point A1, a projection of the point B on the straight line N is a point B1, a projection of the point B on the X axis is a point B2, a projection of the origin O on the straight line L is a point O1, a projection of the point A on the straight line L is a point A2, an intersection point between a straight line of a line segment OB and the straight line L is a point C1, an intersection point between a straight line of a line segment AB and the straight line L is a point C2, and an intersection point between a straight line of a line segment OC and the straight line L is a point C3;

making a length of the line segment OA equivalent to the first distance c1; making ∠AOA1 equivalent to the included angle q1; making a length of the line segment OB equivalent to the distance c2; making ∠BOO1 equivalent to the included angle q2; making a length of the line segment OC equivalent to the distance c3; and making ∠COO1 equivalent to the included angle q3; and determining a length of a line segment OO1 and an expression of the straight line L according to the distance c0 and the included angle q0; determining coordinates of the point A according to the length of the line segment OA and ∠AOA1; determining coordinates of the point B according to the length of the line segment OB and ∠BOO1; determining coordinates of the point C according to the length of the line segment OC and ∠COO1; determining coordinates of the point C2 according to an expression of a straight line passing through the point A and the point B and the expression of the straight line L; determining coordinates of the point C3 according to an expression of a straight line passing through the point C and the origin O and the expression of the straight line L; determining coordinates of the point C1 according to an expression of a straight line passing through the point B and the origin O and the expression of the straight line L; and determining the cropping ratio coefficient of the first image according to the coordinates of the point C1, the coordinates of the point C2, and the coordinates of the point C3.

Figure 3:
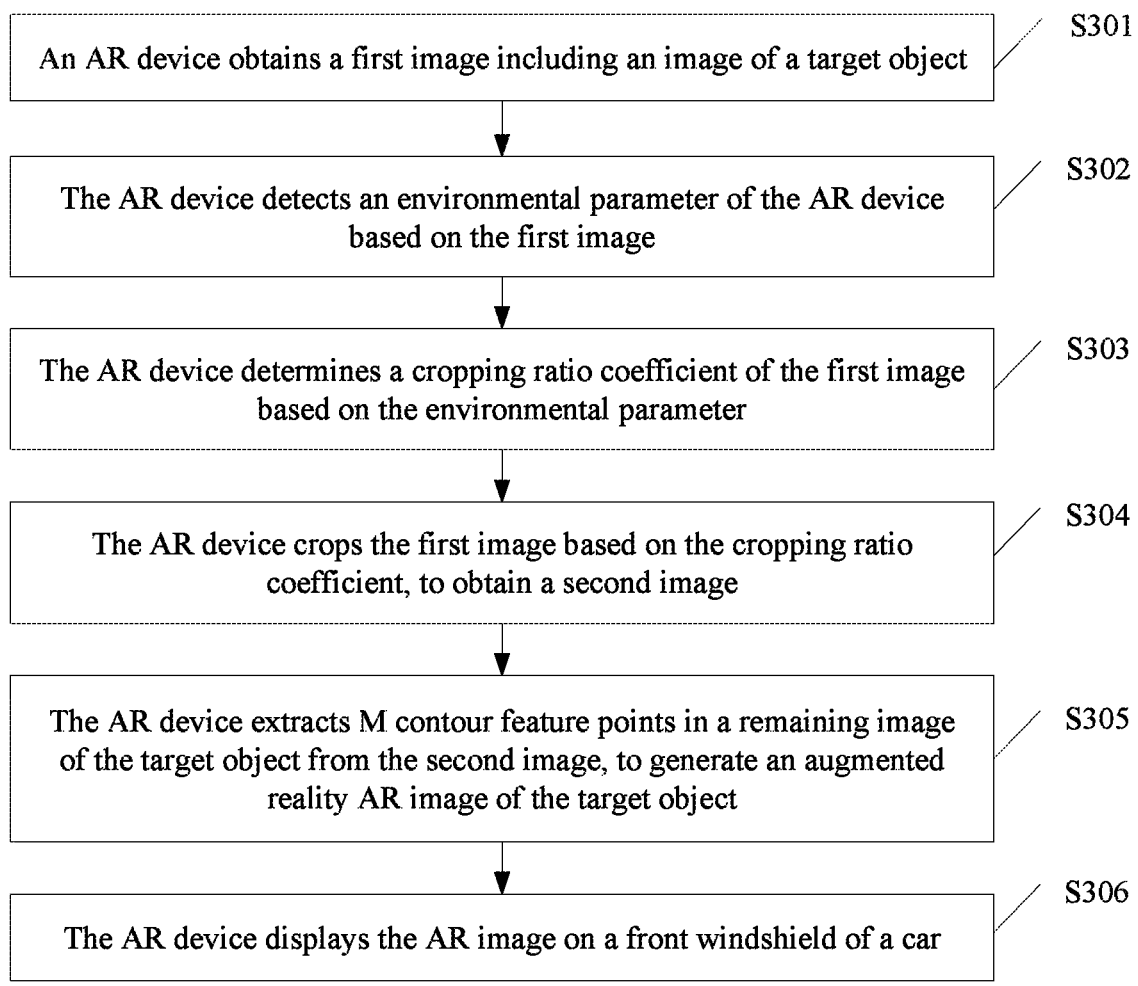
FIG. 3 shows an image information processing method according to a first method embodiment of the present disclosure.

Consistent with the foregoing technical solution, referring to FIG. 3, FIG. 3 shows an image information processing method according to a first method embodiment of the present disclosure. It should be noted that although the image information processing method disclosed in this method embodiment can be implemented based on a physical apparatus of the AR device 100 shown in FIG. 2, the example AR device 100 does not constitute a unique limitation on the image information processing method disclosed in this method embodiment of the present disclosure.

As shown in FIG. 3, the image information processing method includes the following steps.

S301. An AR device obtains a first image including an image of a target object, where the AR device is disposed on a center console of a car, and the target object is located in front of the car.

S302. The AR device detects an environmental parameter of the AR device based on the first image.

S303. The AR device determines a cropping ratio coefficient of the first image based on the environmental parameter.

S304. The AR device crops the first image based on the cropping ratio coefficient, to obtain a second image.

S305. The AR device extracts M contour feature points in a remaining image of the target object from the second image, to generate an AR image of the target object, where M is a positive integer.

S306. The AR device displays the AR image on a front windshield of the car.

It can be learned that in this embodiment of the present disclosure, first, the AR device obtains the first image including the image of the target object, and detects the environmental parameter of the AR device based on the first image. Next, the AR device determines the cropping ratio coefficient of the first image based on the environmental parameter. Further, the AR device crops the first image based on the cropping ratio coefficient, to obtain the second image. Afterwards, the AR device extracts the M contour feature points in the remaining image of the target object from the second image, to generate the AR image of the target object. Finally, the AR device displays the AR image on the front windshield of the car. It can be learned that the AR device provided in this embodiment of the present disclosure can generate the AR image of the target object, and display the generated AR image on the front windshield of the car, so as to help a driver comprehensively and clearly obtain a dynamic status of an environment within a line of sight, so that driving safety is improved.

With reference to the example application scenario shown in FIG. 1.2, the following describes in detail the image information processing method disclosed in this embodiment of the present disclosure.

Figure 4B:
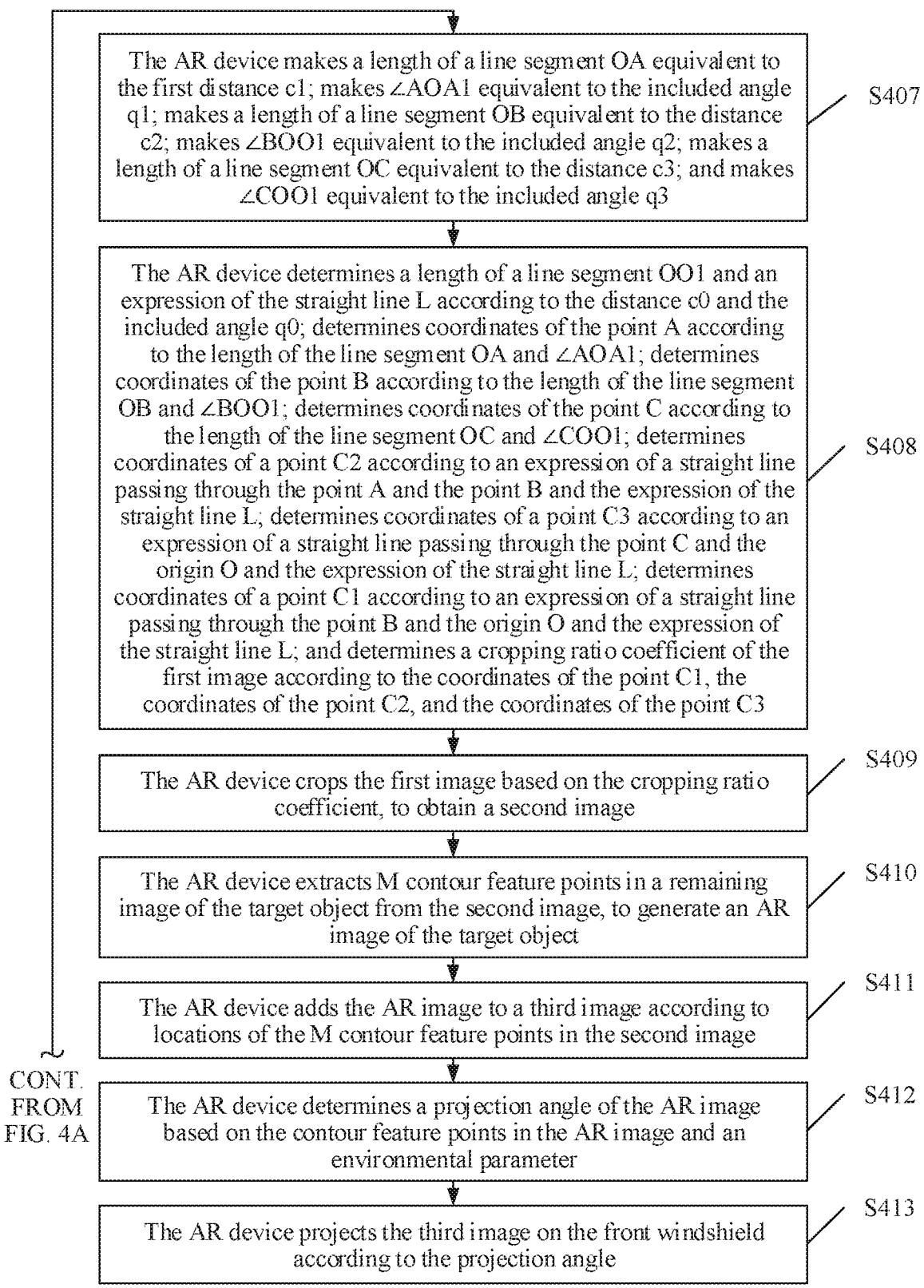

Referring to FIG. 4A and FIG. 4B, FIG. 4A and FIG. 4B are schematic flowcharts of an image information processing method according to a second method embodiment of the present disclosure. The image information processing method specifically includes the following steps.

S401. An AR device photographs a target object by using a ranging feature point on the target object as a focusing reference point, to obtain a first image, where a pixel that is in the first image and is corresponding to the focusing reference point is a focus of the first image.

In specific implementation, the AR device may photograph the target object by using a front-facing camera, to obtain the first image.

S402. The AR device detects a distance c0 between the ranging feature point and a central point of the AR device based on a relative location of the focus of the first image in the first image, and determines an included angle q0 between the device view plane and a line segment corresponding to the distance c0, where the device view plane is a device view plane of the AR device.

In specific implementation, a specific implementation in which the AR device detects the distance c0 between the ranging feature point and the central point of the AR device is as follows:

The AR device determines a first ranging reference angle q based on the relative location of the focus in the first image and a photographing angle range of the front-facing camera of the AR device; and the AR device controls a front rangefinder of the AR device according to the first ranging reference angle q, to detect the distance c0 between the ranging feature point and the central point of the AR device.

The photographing angle range of the front-facing camera includes a vertical photographing angle range and a horizontal photographing angle range. The AR device can determine a vertical angle of the first ranging reference angle q according to a vertical relative location of the focus in the first image and the vertical photographing angle range of the front-facing camera; and determine a horizontal angle of the first ranging reference angle q according to a horizontal relative location of the focus in the first image and the horizontal photographing angle range of the front-facing camera. The vertical angle is the included angle q0.

A manner in which the AR device controls the front rangefinder may include the following manners:

The AR device controls a body or a movable part of the rangefinder to rotate; or the AR device changes a laser emission direction of the rangefinder in an optical means, for example, controls a laser direction by using a reflector, that is, the AR device can change the laser direction by changing a direction of the reflector.

S403. The AR device photographs a driver image to obtain a reference image; detects a first distance c1 between a driver-eye central point and the central point of the AR device based on a relative location of a driver-eye central point pixel of the reference image in the reference image; and determines an included angle q1 between the device view plane and a line segment corresponding to the first distance c1.

The AR device may photograph the driver image by using a rear-facing camera of the AR device, to obtain the reference image, and detect the first distance c and the included angle q1 by using a rear rangefinder of the AR device.

In specific implementation, a process of detecting the first distance c1 and the included angle q1 is similar to a process in step S402. Details are not described herein.

S404. The AR device detects a second distance c2 between a feature point B' on an upper edge of a front windshield and the central point of the AR device, and an included angle q2 between the device view plane and a line segment corresponding to the second distance c2; and detects a third distance c3 between a feature point C' on a lower edge of the front windshield and the central point of the AR device, and an included angle q3 between the device view plane and a line segment corresponding to the third distance c3.

An initial ranging direction of the front rangefinder of the AR device is located on the device view plane, and may be considered as a same direction as a lens photographing direction of the front-facing camera of the AR device. A specific implementation in which the AR device detects the second distance c2, the included angle q2, the third distance c3, and the included angle q3 by using the front rangefinder includes the following steps.

The AR device controls the front rangefinder to sequentially perform ranging from bottom to top, to obtain m distance parameters and m angle parameters, where m is a positive integer greater than or equal to 4;

the AR device determines that a $k^{th}$ distance parameter in the m distance parameters is the second distance c2, and that an angle parameter corresponding to the $k^{th}$ distance parameter is the included angle q2, where a difference between the $k^{th}$ distance parameter and a $(k+1)^{th}$ distance parameter is greater than a preset distance threshold, and the $k^{th}$ distance parameter is greater than the (k+1) distance parameter; and the AR device determines that an $n^{th}$ distance parameter in the m distance parameters is the third distance c3, and that an angle parameter corresponding to the $n^{th}$ distance parameter is the included angle q3, where a difference between the $n^{th}$ distance parameter and an $(n-1)^{th}$ distance parameter is greater than the preset distance threshold, and the $n^{th}$ distance parameter is greater than the $(n-1)^{th}$ distance parameter.

S405. The AR device indicates the central point of the AR device as an origin O of a two-dimensional coordinate system XOY; indicates, as a straight line L, a straight line that passes through the ranging feature point on the target object and is perpendicular to the device view plane; determines a reference plane of the two-dimensional coordinate system XOY based on the origin O and the straight line L; indicates a projected straight line of the device view plane on the reference plane as an X axis; and sets a direction of the X axis as a direction in which the origin O is away from the straight line L.

S406. The AR device indicates a projected point of the driver-eye central point on the reference plane as a point A in the two-dimensional coordinate system XOY; indicates a projected point of the feature point B' on the reference plane as a point B; indicates a projected point of the feature point C' on the reference plane as a point C; and indicates a projected straight line of a driver view plane on the reference plane as a straight line N.

In specific implementation, referring to FIG. 4.1, FIG. 4.1 is a schematic diagram of an equivalent two-dimensional coordinate system XOY in an example application scenario according to an embodiment of the present disclosure. A projection of the point A on the X axis is a point A1. A projection of the point B on the straight line N is a point B1. A projection of the point B on the X axis is a point B2. A projection of the origin O on the straight line L is a point O1. A projection of the point A on the straight line L is a point A2. An intersection point between a straight line of a line segment OB and the straight line L is a point C1. An intersection point between a straight line of a line segment AB and the straight line L is a point C2. An intersection point between a straight line of a line segment OC and the straight line L is a point C3.

S407. The AR device makes a length of the line segment OA equivalent to the first distance c1; makes ∠AOA1 equivalent to the included angle q1; makes a length of a line segment OB equivalent to the distance c2; makes ∠BOO1 equivalent to the included angle q2; makes a length of a line segment OC equivalent to the distance c3; and makes ∠COO1 equivalent to the included angle q3.

S408. The AR device determines a length of a line segment OO1 and an expression of the straight line L according to the distance c0 and the included angle q0; determines coordinates of the point A according to the length of the line segment OA and ∠AOA1; determines coordinates of the point B according to the length of the line segment OB and ∠BOO1; determines coordinates of the point C according to the length of the line segment OC and ∠COO1; determines coordinates of a point C2 according to an expression of a straight line passing through the point A and the point B and the expression of the straight line L; determines coordinates of a point C3 according to an expression of a straight line passing through the point C and the origin O and the expression of the straight line L; determines coordinates of a point C1 according to an expression of a straight line passing through the point B and the origin O and the expression of the straight line L; and determines a cropping ratio coefficient of the first image according to the coordinates of the point C1, the coordinates of the point C2, and the coordinates of the point C3.

S409. The AR device crops the first image based on the cropping ratio coefficient, to obtain a second image.

S410. The AR device extracts M contour feature points in a remaining image of the target object from the second image, to generate an AR image of the target object, where M is a positive integer.

S411. The AR device adds the AR image to a third image according to locations of the M contour feature points in the second image, where the third image is a blank image, and a size of the third image matches a size of the second image.

S412. The AR device determines a projection angle of the AR image based on the contour feature points in the AR image and an environmental parameter.

In specific implementation, a specific implementation in which the AR device determines the projection angle of the AR image based on the contour feature points in the AR image and the environmental parameter may include the following steps.

Referring to FIG. 4.2, FIG. 4.2 is a schematic diagram of a feature point, in a two-dimensional coordinate system XOY, that is on a target object and is corresponding to a contour feature point according to an embodiment of the present disclosure.

The AR device determines that a $j^{th}$ contour feature point in the M contour feature points is a current contour feature point T0. A point that is on the target object and is corresponding to the current contour feature point T0 is a feature point T'.

The AR device indicates the feature point T' on the target object as a point T on the straight line L. An intersection point between a line segment AT and a line segment BC is a projected point T1.

The AR device determines coordinates of the point T according to a location of the current contour feature point T0 in the second image and a correspondence between a line segment C2C3 and the second image.

The AR device determines an expression of the line segment AT according to the coordinates of the point T and the coordinates of the point A.

The AR device determines coordinates of the projected point T1 according to the expression of the line segment AT and an expression of the line segment BC.

The AR device calculates an included angle q6 between a line segment OT1 and the X axis according to the coordinates of the projected point T1.

The AR device determines the included angle q6 as the projection angle of the AR device.

S413. The AR device projects the third image on the front windshield according to the projection angle.

When a driver looks at the target object through the front windshield, the driver can see, with eyes, the AR image that is displayed on the front windshield and conforms to the image of the target object. For example, if the target object is a telegraph pole in front of the car, a contour image of the telegraph pole is displayed on the front windshield, so as to help the driver comprehensively and clearly obtain a dynamic status of an environment within a line of sight, so that driving safety is improved.

In specific implementation, the AR device may project the third image on the front windshield by using an optical projector in the AR device.

It can be learned that in this embodiment of the present disclosure, first, the AR device obtains the first image including the image of the target object, and detects the environmental parameter of the AR device based on the first image. Next, the AR device determines the cropping ratio coefficient of the first image based on the environmental parameter. Further, the AR device crops the first image based on the cropping ratio coefficient, to obtain the second image. Afterwards, the AR device extracts the M contour feature points in the remaining image of the target object from the second image, to generate the AR image of the target object. Finally, the AR device displays the AR image on the front windshield of the car. It can be learned that the AR device provided in this embodiment of the present disclosure can generate the AR image of the target object, and display the generated AR image on the front windshield of the car, so as to help the driver comprehensively and clearly obtain the dynamic status of the environment within the line of sight, so that driving safety is improved.

Figure 5B:
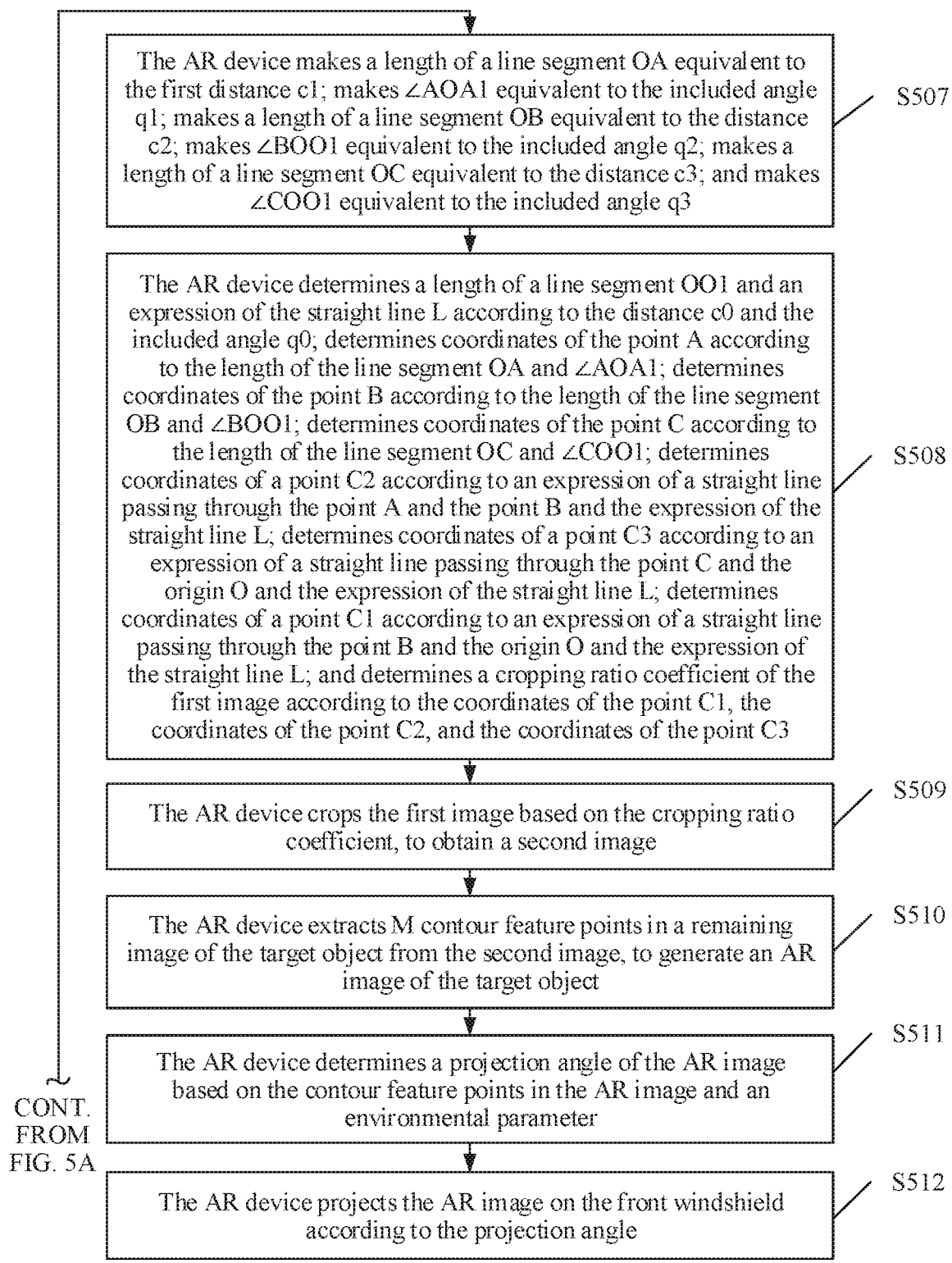

Referring to FIG. 5A and FIG. 5B, FIG. 5A and FIG. 5B are schematic flowcharts of an image information processing method according to a third method embodiment of the present disclosure. The image information processing method specifically includes the following steps.

S501. An AR device photographs a target object by using a ranging feature point on the target object as a focusing reference point, to obtain a first image, where a pixel that is in the first image and is corresponding to the focusing reference point is a focus of the first image.

S502. The AR device detects a distance c0 between the ranging feature point and a central point of the AR device based on a relative location of the focus of the first image in the first image, and determines an included angle q0 between the device view plane and a line segment corresponding to the distance c0, where the device view plane is a device view plane of the AR device.

S503. The AR device photographs a driver image to obtain a reference image; detects a first distance c1 between a driver-eye central point and the central point of the AR device based on a relative location of a driver-eye central point pixel of the reference image in the reference image; and determines an included angle q1 between the device view plane and a line segment corresponding to the first distance c1.

S504. The AR device detects a second distance c2 between a feature point B' on an upper edge of a front windshield and the central point of the AR device, and an included angle q2 between the device view plane and a line segment corresponding to the second distance c2; and detects a third distance c3 between a feature point C' on a lower edge of the front windshield and the central point of the AR device, and an included angle q3 between the device view plane and a line segment corresponding to the third distance c3.

S505. The AR device indicates the central point of the AR device as an origin O of a two-dimensional coordinate system XOY; indicates, as a straight line L, a straight line that passes through the ranging feature point on the target object and is perpendicular to the device view plane; determines a reference plane of the two-dimensional coordinate system XOY based on the origin O and the straight line L; indicates a projected straight line of the device view plane on the reference plane as an X axis; and sets a direction of the X axis as a direction in which the origin O is away from the straight line L.

S506. The AR device indicates a projected point of the driver-eye central point on the reference plane as a point A in the two-dimensional coordinate system XOY; indicates a projected point of the feature point B' on the reference plane as a point B; indicates a projected point of the feature point C' on the reference plane as a point C; and indicates a projected straight line of a driver view plane on the reference plane as a straight line N.

In specific implementation, referring to FIG. 4.1, a projection of the point A on the X axis is a point A1, a projection of the point B on the straight line N is a point B1, a projection of the point B on the X axis is a point B2, a projection of the origin O on the straight line L is a point O1, a projection of the point A on the straight line L is a point A2, an intersection point between a straight line of a line segment OB and the straight line L is a point C1, an intersection point between a straight line of a line segment AB and the straight line L is a point C2, and an intersection point between a straight line of a line segment OC and the straight line L is a point C3.

S507. The AR device makes a length of the line segment OA equivalent to the first distance c1; makes ∠AOA1 equivalent to the included angle q1; makes a length of a line segment OB equivalent to the distance c2; makes ∠BOO1 equivalent to the included angle q2; makes a length of a line segment OC equivalent to the distance c3; and makes ∠COO1 equivalent to the included angle q3.

S508. The AR device determines a length of a line segment OO1 and an expression of the straight line L according to the distance c0 and the included angle q0; determines coordinates of the point A according to the length of the line segment OA and ∠AOA1; determines coordinates of the point B according to the length of the line segment OB and ∠BOO1; determines coordinates of the point C according to the length of the line segment OC and ∠COO1; determines coordinates of a point C2 according to an expression of a straight line passing through the point A and the point B and the expression of the straight line L; determines coordinates of a point C3 according to an expression of a straight line passing through the point C and the origin O and the expression of the straight line L; determines coordinates of a point C1 according to an expression of a straight line passing through the point B and the origin O and the expression of the straight line L; and determines a cropping ratio coefficient of the first image according to the coordinates of the point C1, the coordinates of the point C2, and the coordinates of the point C3.

S509. The AR device crops the first image based on the cropping ratio coefficient, to obtain a second image.

S510. The AR device extracts M contour feature points in a remaining image of the target object from the second image, to generate an AR image of the target object, where M is a positive integer.

S511. The AR device determines a projection angle of the AR image based on the contour feature points in the AR image and an environmental parameter.

In specific implementation, a specific implementation in which the AR device determines the projection angle of the AR image based on the contour feature points in the AR image and the environmental parameter may include the following steps.

Refer to FIG. 4.2.

The AR device determines that a $j^{th}$ contour feature point in the M contour feature points is a current contour feature point T0. A point that is on the target object and is corresponding to the current contour feature point T0 is a feature point T'.

The AR device indicates the feature point T' on the target object as a point T on the straight line L. An intersection point between a line segment AT and a line segment BC is a projected point T1.

The AR device determines coordinates of the point T according to a location of the current contour feature point T0 in the second image and a correspondence between a line segment C2C3 and the second image.

The AR device determines an expression of the line segment AT according to the coordinates of the point T and the coordinates of the point A.

The AR device determines coordinates of the projected point T1 according to the expression of the line segment AT and an expression of the line segment BC.

The AR device calculates an included angle q6 between a line segment OT1 and the X axis according to the coordinates of the projected point T1.

The AR device determines the included angle q6 as the projection angle of the AR device.

S512. The AR device projects the AR image on the front windshield according to the projection angle.

When a driver looks at the target object through the front windshield, the driver can see, with eyes, the AR image that is displayed on the front windshield and conforms to the image of the target object. For example, if the target object is a telegraph pole in front of the car, a contour image of the telegraph pole is displayed on the front windshield, so as to help the driver comprehensively and clearly obtain a dynamic status of an environment within a line of sight, so that driving safety is improved.

In specific implementation, the AR device may project the AR image on the front windshield by using a laser projector in the AR device.

Because the laser projector in the AR device may efficiently project multiple AR images within an extremely short time period, the AR device in this embodiment of the present disclosure may project multiple processed AR images on the front windshield of the car at a time, so as to help improve image processing efficiency of the AR device.

It can be learned that in this embodiment of the present disclosure, first, the AR device obtains the first image including the image of the target object, and detects the environmental parameter of the AR device based on the first image. Next, the AR device determines the cropping ratio coefficient of the first image based on the environmental parameter. Further, the AR device crops the first image based on the cropping ratio coefficient, to obtain the second image. Afterwards, the AR device extracts the M contour feature points in the remaining image of the target object from the second image, to generate the AR image of the target object. Finally, the AR device displays the AR image on the front windshield of the car. It can be learned that the AR device provided in this embodiment of the present disclosure can generate the AR image of the target object, and display the generated AR image on the front windshield of the car, so as to help the driver comprehensively and clearly obtain the dynamic status of the environment within the line of sight, so that driving safety is improved.

Figure 6B:
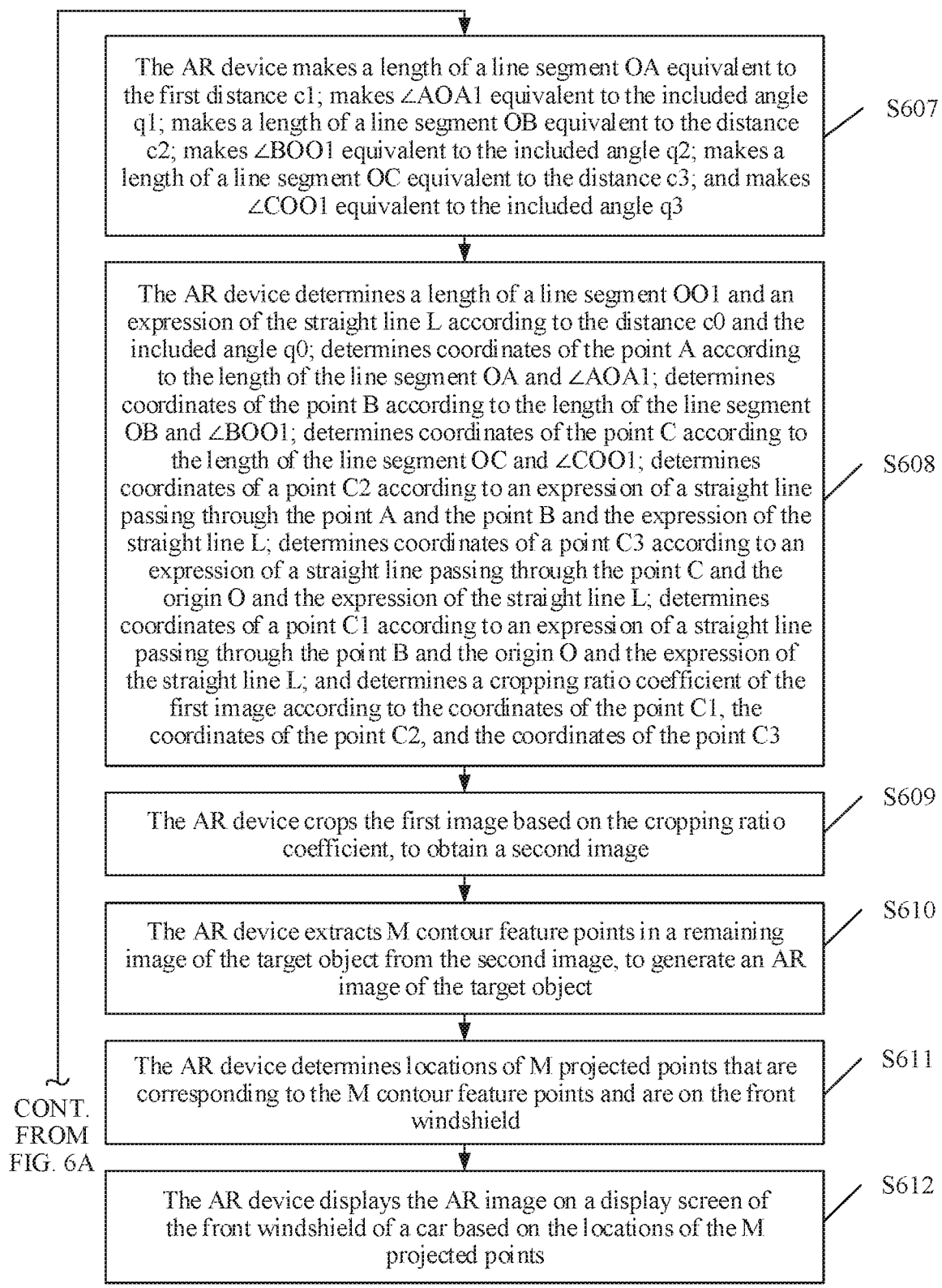

Referring to FIG. 6A and FIG. 6B, FIG. 6A and FIG. 6B are schematic flowcharts of an image information processing method according to a fourth method embodiment of the present disclosure. The image information processing method specifically includes the following steps.

S601. An AR device photographs a target object by using a ranging feature point on the target object as a focusing reference point, to obtain a first image, where a pixel that is in the first image and is corresponding to the focusing reference point is a focus of the first image.

S602. The AR device detects a distance c0 between the ranging feature point and a central point of the AR device based on a relative location of the focus of the first image in the first image, and determines an included angle q0 between the device view plane and a line segment corresponding to the distance c0, where the device view plane is a device view plane of the AR device.

S603. The AR device photographs a driver image to obtain a reference image; detects a first distance c1 between a driver-eye central point and the central point of the AR device based on a relative location of a driver-eye central point pixel of the reference image in the reference image; and determines an included angle q1 between the device view plane and a line segment corresponding to the first distance c1.

S604. The AR device detects a second distance c2 between a feature point B' on an upper edge of a front windshield and the central point of the AR device, and an included angle q2 between the device view plane and a line segment corresponding to the second distance c2; and detects a third distance c3 between a feature point C' on a lower edge of the front windshield and the central point of the AR device, and an included angle q3 between the device view plane and a line segment corresponding to the third distance c3.

S605. The AR device indicates the central point of the AR device as an origin O of a two-dimensional coordinate system XOY; indicates, as a straight line L, a straight line that passes through the ranging feature point on the target object and is perpendicular to the device view plane; determines a reference plane of the two-dimensional coordinate system XOY based on the origin O and the straight line L; indicates a projected straight line of the device view plane on the reference plane as an X axis; and sets a direction of the X axis as a direction in which the origin O is away from the straight line L.

S606. The AR device indicates a projected point of the driver-eye central point on the reference plane as a point A in the two-dimensional coordinate system XOY; indicates a projected point of the feature point B' on the reference plane as a point B; indicates a projected point of the feature point C' on the reference plane as a point C; and indicates a projected straight line of a driver view plane on the reference plane as a straight line N.

In specific implementation, referring to FIG. 4.1, a projection of the point A on the X axis is a point A1, a projection of the point B on the straight line N is a point B1, a projection of the point B on the X axis is a point B2, a projection of the origin O on the straight line L is a point O1, a projection of the point A on the straight line L is a point A2, an intersection point between a straight line of a line segment OB and the straight line L is a point C1, an intersection point between a straight line of a line segment AB and the straight line L is a point C2, and an intersection point between a straight line of a line segment OC and the straight line L is a point C3.

S607. The AR device makes a length of the line segment OA equivalent to the first distance c1; makes ∠AOA1 equivalent to the included angle q1; makes a length of a line segment OB equivalent to the distance c2; makes ∠BOO1 equivalent to the included angle q2; makes a length of a line segment OC equivalent to the distance c3; and makes ∠COO1 equivalent to the included angle q3.

S608. The AR device determines a length of a line segment OO1 and an expression of the straight line L according to the distance c0 and the included angle q0; determines coordinates of the point A according to the length of the line segment OA and ∠AOA1; determines coordinates of the point B according to the length of the line segment OB and ∠BOO1; determines coordinates of the point C according to the length of the line segment OC and ∠COO1; determines coordinates of a point C2 according to an expression of a straight line passing through the point A and the point B and the expression of the straight line L; determines coordinates of a point C3 according to an expression of a straight line passing through the point C and the origin O and the expression of the straight line L; determines coordinates of a point C1 according to an expression of a straight line passing through the point B and the origin O and the expression of the straight line L; and determines a cropping ratio coefficient of the first image according to the coordinates of the point C1, the coordinates of the point C2, and the coordinates of the point C3.

S609. The AR device crops the first image based on the cropping ratio coefficient, to obtain a second image.

S610. The AR device extracts M contour feature points in a remaining image of the target object from the second image, to generate an AR image of the target object, where M is a positive integer.

S611. The AR device determines locations of M projected points that are corresponding to the M contour feature points and are on the front windshield.

In specific implementation, a specific implementation in which the AR device determines the locations of the M projected points that are corresponding to the M contour feature points and are on the front windshield is as follows.

Refer to FIG. 4.2.

The AR device determines that a $j^{th}$ contour feature point in the M contour feature points is a current contour feature point T0. A point that is on the target object and is corresponding to the current contour feature point T0 is a feature point T'.

The AR device indicates the feature point T' on the target object as a point T on the straight line L. An intersection point between a line segment AT and a line segment BC is a projected point T1.

The AR device determines coordinates of the point T according to a location of the current contour feature point T0 in the second image and a correspondence between a line segment C2C3 and the second image.

The AR device determines an expression of the line segment AT according to the coordinates of the point T and the coordinates of the point A.

The AR device determines coordinates of the projected point T1 according to the expression of the line segment AT and an expression of the line segment BC.

The AR device adds the coordinates of the projected point T1 to a projected-point location set, and stores a mapping relationship between the $j^{th}$ contour feature point and the coordinates of the projected point T1.

If determining that the j contour feature point is the last contour feature point in the M contour feature points, the AR device determines that coordinates of projected points in the projected-point location set are the locations of the M projected points that are corresponding to the M contour feature points and are on the front windshield.

S612. The AR device displays the AR image on a display screen of the front windshield of a car based on the locations of the M projected points.

When a driver looks at the target object through the front windshield, the driver can see, with eyes, the AR image that is displayed on the front windshield and conforms to the image of the target object. For example, if the target object is a telegraph pole in front of the car, a contour image of the telegraph pole is displayed on the front windshield, so as to help the driver comprehensively and clearly obtain a dynamic status of an environment within a line of sight, so that driving safety is improved.

In specific implementation, the AR device may transmit the AR image and the locations of the M projected points to the display screen of the front windshield by using a communications interface of the AR device, so that the AR image is displayed on the front windshield of the car.

It can be learned that in this embodiment of the present disclosure, first, the AR device obtains the first image including the image of the target object, and detects the environmental parameter of the AR device based on the first image. Next, the AR device determines the cropping ratio coefficient of the first image based on the environmental parameter. Further, the AR device crops the first image based on the cropping ratio coefficient, to obtain the second image. Afterwards, the AR device extracts the M contour feature points in the remaining image of the target object from the second image, to generate the AR image of the target object. Finally, the AR device displays the AR image on the front windshield of the car. It can be learned that the AR device provided in this embodiment of the present disclosure can generate the AR image of the target object, and display the generated AR image on the front windshield of the car, so as to help the driver comprehensively and clearly obtain the dynamic status of the environment within the line of sight, so that driving safety is improved.

Some or all steps performed by the AR device may be specifically implemented by the AR device by executing a software module (program code) in the foregoing memory. For example, step S301, step S401, step S501, and step S601 may be implemented by the AR device by executing the image obtaining module shown in FIG. 2. Step S302, step S402, step S403, step S404, step S502, step S503, step S504, step S602, step S603, and step S604 may be implemented by the AR device by executing the parameter detection module shown in FIG. 2. Step S303, step S405 to step S408, step S505 to step S508, and step S605 to step S608 may be implemented by the AR device by executing the coefficient determining module shown in FIG. 2. Step S304, step S409, step S509, and step S609 may be implemented by the AR device by executing the image cropping module shown in FIG. 2. Step S305, step S410, step S510, and step S610 may be implemented by the AR device by executing the image generation module shown in FIG. 2. Step S306, step S411 to step S413, step S511 and step S512, and step S611 and step S612 may be implemented by the AR device by executing the image output module shown in FIG. 2.

Figure 7:
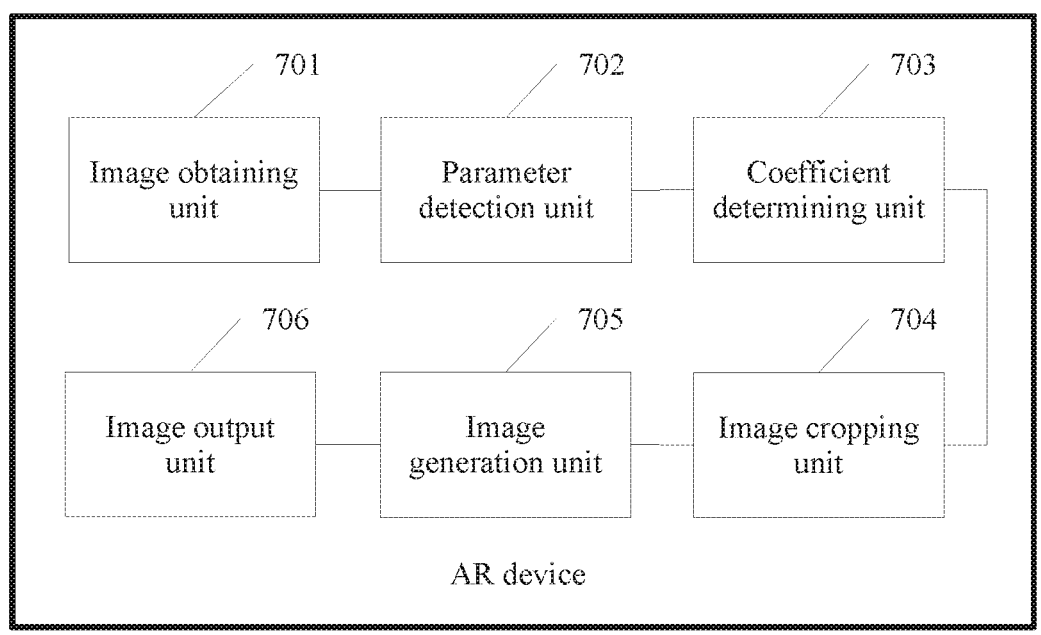
FIG. 7 is a block diagram of simplified functional units of an AR device according to an apparatus embodiment of the present disclosure.

The following is an apparatus embodiment of the present disclosure. This apparatus embodiment of the present disclosure is used to execute the method implemented in the method embodiment of the present disclosure. Referring to FIG. 7, FIG. 7 is a block diagram of simplified functional units of an AR device according to an apparatus embodiment of the present disclosure.

As shown in FIG. 7, the AR device includes an image obtaining unit 701, a parameter detection unit 702, a coefficient determining unit 703, an image cropping unit 704, an image generation unit 705, and an image output unit 706.

The image obtaining unit 701 is configured to obtain a first image including an image of a target object. The AR device is disposed on a center console of a car. The target object is located in front of the car.

The parameter detection unit 702 is configured to detect an environmental parameter of the AR device based on the first image.

The coefficient determining unit 703 is configured to determine a cropping ratio coefficient of the first image based on the environmental parameter.

The image cropping unit 704 is configured to crop the first image based on the cropping ratio coefficient, to obtain a second image.

The image generation unit 705 is configured to extract M contour feature points in a remaining image of the target object from the second image, to generate an AR image of the target object, where M is a positive integer.

The image output unit 706 is configured to display the AR image on a front windshield of the car.

Optionally, a specific implementation in which the image output unit 706 displays the AR image on the front windshield of the car is:

adding the AR image to a third image according to locations of the M contour feature points in the second image, where the third image is a blank image, and a size of the third image matches a size of the second image;

determining a projection angle of the AR image based on the contour feature points in the AR image and the environmental parameter; and projecting the third image on the front windshield according to the projection angle.

Optionally, a specific implementation in which the image output unit 706 displays the AR image on the front windshield of the car is:

determining a projection angle of the AR image based on the contour feature points in the AR image and the environmental parameter; and projecting the AR image on the front windshield according to the projection angle.

Optionally, the front windshield includes a display screen, and a specific implementation in which the image output unit 706 displays the AR image on the front windshield of the car is:

determining locations of M projected points that are corresponding to the M contour feature points and are on the front windshield; and displaying the AR image on the display screen of the front windshield of the car based on the locations of the M projected points.

Optionally, a specific implementation in which the image obtaining unit 701 obtains the first image including the image of the target object is: photographing the target object by using a ranging feature point on the target object as a focusing reference point, to obtain the first image. A pixel that is in the first image and is corresponding to the focusing reference point is a focus of the first image.

Optionally, a specific implementation in which the parameter detection unit 702 detects the environmental parameter of the AR device based on the first image is:

detecting a distance c0 between the ranging feature point and a central point of the AR device based on a relative location of the focus of the first image in the first image, and determining an included angle q0 between the device view plane and a line segment corresponding to the distance c0, where the device view plane is a device view plane of the AR device;

photographing a driver image to obtain a reference image; detecting a first distance c1 between a driver-eye central point and the central point of the AR device based on a relative location of a driver-eye central point pixel of the reference image in the reference image; and determining an included angle q1 between the device view plane and a line segment corresponding to the first distance c1; and detecting a second distance c2 between a feature point B' on an upper edge of the front windshield and the central point of the AR device, and an included angle q2 between the device view plane and a line segment corresponding to the second distance c2; and detecting a third distance c3 between a feature point C' on a lower edge of the front windshield and the central point of the AR device, and an included angle q3 between the device view plane and a line segment corresponding to the third distance c3.

Optionally, a specific implementation in which the coefficient determining unit 703 determines the cropping ratio coefficient of the first image based on the environmental parameter is:

indicating the central point of the AR device as an origin O of a two-dimensional coordinate system XOY; indicating, as a straight line L, a straight line that passes through the ranging feature point on the target object and is perpendicular to the device view plane; determining a reference plane of the two-dimensional coordinate system XOY based on the origin O and the straight line L; indicating a projected straight line of the device view plane on the reference plane as an X axis; and setting a direction of the X axis as a direction in which the origin O is away from the straight line L;

indicating a projected point of the driver-eye central point on the reference plane as a point A in the two-dimensional coordinate system XOY; indicating a projected point of the feature point B' on the reference plane as a point B; indicating a projected point of the feature point C' on the reference plane as a point C; and indicating a projected straight line of a driver view plane on the reference plane as a straight line N, where a projection of the point A on the X axis is a point A1, a projection of the point B on the straight line N is a point B1, a projection of the point B on the X axis is a point B2, a projection of the origin O on the straight line L is a point O1, a projection of the point A on the straight line L is a point A2, an intersection point between a straight line of a line segment OB and the straight line L is a point C1, an intersection point between a straight line of a line segment AB and the straight line L is a point C2, and an intersection point between a straight line of a line segment OC and the straight line L is a point C3;

making a length of the line segment OA equivalent to the first distance c1; making $\angle AOA1$ equivalent to the included angle q1; making a length of the line segment OB equivalent to the distance c2; making $\angle BOO1$ equivalent to the included angle q2; making a length of the line segment OC equivalent to the distance c3; and making $\angle COO1$ equivalent to the included angle q3; and determining a length of a line segment OO1 and an expression of the straight line L according to the distance c0 and the included angle q0; determining coordinates of the point A according to the length of the line segment OA and $\angle AOA1$; determining coordinates of the point B according to the length of the line segment OB and $\angle BOO1$; determining coordinates of the point C according to the length of the line segment OC and ∠COO1; determining coordinates of the point C2 according to an expression of a straight line passing through the point A and the point B and the expression of the straight line L; determining coordinates of the point C3 according to an expression of a straight line passing through the point C and the origin O and the expression of the straight line L; determining coordinates of the point C1 according to an expression of a straight line passing through the point B and the origin O and the expression of the straight line L; and determining the cropping ratio coefficient of the first image according to the coordinates of the point C1, the coordinates of the point C2, and the coordinates of the point C3.

It should be noted that the AR device described in this functional unit apparatus embodiment of the present disclosure is presented in a form of a functional unit. The term "unit" used herein should be understood as a meaning as broad as possible. An object for implementing a described function of each "unit" may be, for example, an integrated circuit ASIC, a single circuit, a processor (shared, dedicated, or chipset) configured to perform one or more software or firmware programs, a memory, a combined logic circuit, and/or another suitable component that provides or implements the function.

For example, persons skilled in the art may learn that a composition form of a hardware carrier of the AR device may be specifically the AR device 100 shown in FIG. 1.2 and FIG. 2.

A function of the image obtaining unit 701 may be implemented by the processor 101 and the memory 102 in the AR device 100. The processor 100 runs the image obtaining module in the memory 102, so as to invoke the front-facing camera 103 to obtain the first image including the image of the target object.

A function of the parameter detection unit 702 may be implemented by the processor 101 and the memory 102 in the AR device 100. The processor 100 runs the parameter obtaining module in the memory 102, so as to detect the environmental parameter of the AR device based on the first image.

A function of the coefficient determining unit 703 may be implemented by the processor 101 and the memory 102 in the AR device 100. The processor 100 runs the coefficient determining module in the memory 102, so as to determine the cropping ratio coefficient of the first image based on the environmental parameter.

A function of the image cropping unit 704 may be implemented by the processor 101 and the memory 102 in the AR device 100. The processor 100 runs the image cropping module in the memory 102, so as to crop the first image based on the cropping ratio coefficient, to obtain the second image.

A function of the image generation unit 705 may be implemented by the processor 101 and the memory 102 in the AR device 100. The processor 100 runs the image generation module in the memory 102, so as to extract the M contour feature points in the remaining image of the target object from the second image, to generate the AR image of the target object.

A function of the image output unit 706 may be implemented by the processor 101 and the memory 102 in the AR device 100. The processor 100 runs the image output module in the memory 102, so as to display the AR image on the front windshield of the car.

It can be learned that in this embodiment of the present disclosure, first, the image obtaining unit of the AR device disclosed in this embodiment of the present disclosure obtains the first image including the image of the target object. Next, the parameter detection unit of the AR device detects the environmental parameter of the AR device based on the first image. Further, the coefficient determining unit of the AR device determines the cropping ratio coefficient of the first image based on the environmental parameter. Moreover, the image cropping unit of the AR device crops the first image based on the cropping ratio coefficient, to obtain the second image. Afterwards, the image generation unit of the AR device extracts the M contour feature points in the remaining image of the target object from the second image, to generate the AR image of the target object. Finally, the image output unit of the AR device displays the AR image on the front windshield of the car. It can be learned that the AR device provided in this embodiment of the present disclosure can generate the AR image of the target object, and display the generated AR image on the front windshield of the car, so as to help a driver comprehensively and clearly obtain a dynamic status of an environment within a line of sight, so that driving safety is improved.

Persons of ordinary skill in the art may understand that all or some steps of the methods in the embodiments may be implemented by a program instructing relevant hardware. The program may be stored in a computer readable storage medium. The storage medium may include a flash memory, a ROM, a RAM, a magnetic disk, or an optical disc.

The foregoing describes in detail the image information processing method and the AR device that are disclosed in the embodiments of the present disclosure. In this specification, specific examples are used to describe principles and implementations of the present disclosure, and the description of the embodiments is only intended to help understand the method and core ideas of the present disclosure. In addition, persons of ordinary skill in the art may, based on the idea of the present disclosure, make modifications with respect to the specific implementations and the application scope. Therefore, the content of this specification shall not be construed as a limitation to the present disclosure.

What is claimed is:

1. An image information processing method, comprising:
obtaining, by an augmented reality (AR) device, a first image comprising an image of a target object, wherein the AR device is disposed on a center console of a car, and wherein the target object is located in front of the car;
detecting, by the AR device, an environmental parameter of the AR device based on the first image and one or more distances between a central point of the AR device and one or more other points;
determining, by the AR device, a cropping ratio coefficient of the first image based on the environmental parameter of the AR device;
cropping, by the AR device, the first image based on the cropping ratio coefficient to obtain a second image;
extracting, by the AR device, M contour feature points in a remaining image of the target object from the second image to generate an AR image of the target object, wherein M is a positive integer;
adding, by the AR device, the AR image to a third image according to locations of the M contour feature points in the second image, wherein the third image is a blank image, and wherein a size of the third image matches a size of the second image;
determining, by the AR device, a projection angle of the AR image based on contour feature points in the AR image and the environmental parameter; and projecting, by the AR device, the third image on a front windshield of the car according to the projection angle.

2. The method of claim 1, wherein displaying the AR image on the front windshield of the car comprises:
   determining, by the AR device, a projection angle of the AR image based on contour feature points in the AR image and the environmental parameter; and
   projecting, by the AR device, the AR image on the front windshield according to the projection angle.

3. The method of claim 1, wherein the front windshield comprises a display screen, and wherein displaying the AR image on the front windshield of the car comprises:
   determining, by the AR device, locations of M projected points that correspond to the M contour feature points and are on the front windshield; and
   displaying, by the AR device, the AR image on the display screen of the front windshield of the car based on the locations of the M projected points.

4. The method of claim 1, wherein obtaining the first image comprises photographing, by the AR device, the target object using a ranging feature point on the target object as a focusing reference point to obtain the first image, and wherein a pixel that is in the first image and that corresponds to the focusing reference point is a focus of the first image.

5. The method of claim 4, wherein detecting the environmental parameter of the AR device comprises:
   detecting, by the AR device, a distance c0 between the ranging feature point and the central point of the AR device based on a relative location of the focus of the first image;
   determining an included angle q0 between the device view plane and a line segment corresponding to the distance c0, wherein the device view plane is a device view plane of the AR device;
   photographing, by the AR device, a driver image to obtain a reference image;
   detecting a first distance c1 between a driver-eye central point and the central point of the AR device based on a relative location of a driver-eye central point pixel of the reference image in the reference image;
   determining an included angle q1 between the device view plane and a line segment corresponding to the first distance c1;
   detecting, by the AR device, a second distance c2 between a feature point B' on an upper edge of the front windshield and the central point of the AR device;
   determining an included angle q2 between the device view plane and a line segment corresponding to the second distance c2;
   detecting a third distance c3 between a feature point C' on a lower edge of the front windshield and the central point of the AR device; and
   determining an included angle q3 between the device view plane and a line segment corresponding to the third distance c3.

6. The method of claim 5, wherein determining the cropping ratio coefficient of the first image comprises:
   indicating, by the AR device, the central point of the AR device as an origin O of a two-dimensional coordinate system XOY;
   indicating, as a straight line L, a straight line that passes through the ranging feature point on the target object and is perpendicular to the device view plane;
   determining a reference plane of the two-dimensional coordinate system XOY based on the origin O and the straight line L;
   indicating a projected straight line of the device view plane on the reference plane as an X axis;
   setting a direction of the X axis as a direction in which the origin O is away from the straight line L;
   indicating, by the AR device, a projected point of the driver-eye central point on the reference plane as a point A in the two-dimensional coordinate system XOY;
   indicating a projected point of the feature point B' on the reference plane as a point B;
   indicating a projected point of the feature point C' on the reference plane as a point C;
   indicating a projected straight line of a driver view plane on the reference plane as a straight line N, wherein a projection of the point A on the X axis is a point A1, wherein a projection of the point B on the straight line N is a point B1, wherein a projection of the point B on the X axis is a point B2, wherein a projection of the origin O on the straight line L is a point O1, wherein a projection of the point A on the straight line L is a point A2, wherein an intersection point between a straight line of a line segment OB and the straight line L is a point C1, wherein an intersection point between a straight line of a line segment AB and the straight line L is a point C2, and wherein an intersection point between a straight line of a line segment OC and the straight line L is a point C3;
   making, by the AR device, a length of a line segment OA from the origin O to the point A equivalent to the first distance c1;
   making an angle ∠AOA1 equivalent to the included angle q1, wherein the angle ∠AOA1 is formed by the point A, the origin O, and the point A1;
   making a length of the line segment OB equivalent to the distance c2;
   making an angle ∠BOO1 equivalent to the included angle q2, wherein the angle ∠BOO1 is formed by the point B, the origin O, and the point O1;
   making a length of the line segment OC equivalent to the distance c3;
   making an angle ∠COO1 equivalent to the included angle q3, wherein the angle ∠COO1 is formed by the point C, the origin O, and the point O1;
   determining, by the AR device, a length of a line segment OO1 and an expression of the straight line L according to the distance c0 and the included angle q0, wherein the line segment OO1 is a line segment from the origin O to the point O1;
   determining coordinates of the point A according to the length of the line segment OA and the angle ∠AOA1;
   determining coordinates of the point B according to the length of the line segment OB and the angle ∠BOO1;
   determining coordinates of the point C according to the length of the line segment OC and the angle ∠COO1;
   determining coordinates of the point C2 according to an expression of a straight line passing through the point A and the point B and the expression of the straight line L;
   determining coordinates of the point C3 according to an expression of a straight line passing through the point C and the origin O and the expression of the straight line L;
   determining coordinates of the point C1 according to an expression of a straight line passing through the point B and the origin O and the expression of the straight line L; and determining the cropping ratio coefficient of the first image according to the coordinates of the point C1, the coordinates of the point C2, and the coordinates of the point C3.

7. An augmented reality (AR) device, comprising:
a processor; and
memory coupled to the processor and storing instructions that, when executed by the processor, cause the AR device to be configured to:
    obtain a first image comprising an image of a target object, wherein the AR device is disposed on a center console of a car, and wherein the target object is located in front of the car;
    detect an environmental parameter of the AR device based on the first image and one or more distances between a central point of the AR device and one or more other points;
    determine a cropping ratio coefficient of the first image based on the environmental parameter of the AR device;
    crop the first image based on the cropping ratio coefficient to obtain a second image;
    extract M contour feature points in a remaining image of the target object from the second image to generate an AR image of the target object, wherein M is a positive integer;
    add the AR image to a third image according to locations of the M contour feature points in the second image, wherein the third image is a blank image, and wherein a size of the third image matches a size of the second image;
    determine a projection angle of the AR image based on contour feature points in the AR image and the environmental parameter; and
    project the third image on a front windshield of the car according to the projection angle.

8. The AR device of claim 7, wherein the instructions are configured to cause the AR device to be configured to display the AR image on the front windshield of the car by causing the AR device to be configured to:
    determine a projection angle of the AR image based on contour feature points in the AR image and the environmental parameter; and
    project the AR image on the front windshield according to the projection angle.

9. The AR device of claim 7, wherein the front windshield comprises a display screen, and wherein the instructions are configured to cause the AR device to be configured to display the AR image on the front windshield of the car by causing the AR device to:
    determine locations of M projected points that correspond to the M contour feature points and are on the front windshield; and
    display the AR image on the display screen of the front windshield of the car based on the locations of the M projected points.

10. The AR device of claim 7, wherein the instructions are further configured to cause the AR device to be configured to obtain the first image by causing the AR device to be configured to photograph the target object using a ranging feature point on the target object as a focusing reference point to obtain the first image, and wherein a pixel that is in the first image and that corresponds to the focusing reference point is a focus of the first image.

11. The AR device of claim 10, wherein the instructions are further configured to cause the AR device to be config-
ured to detect the environmental parameter by causing the AR device to be configured to:
    detect a distance c0 between the ranging feature point and the central point of the AR device based on a relative location of the focus of the first;
    determine an included angle q0 between the device view plane and a line segment corresponding to the distance c0, wherein the device view plane is a device view plane of the AR device;
    photograph a driver image to obtain a reference image;
    detect a first distance c1 between a driver-eye central point and the central point of the AR device based on a relative location of a driver-eye central point pixel of the reference image;
    determine an included angle q1 between the device view plane and a line segment corresponding to the first distance c1;
    detect a second distance c2 between a feature point B' on an upper edge of the front windshield and the central point of the AR device;
    determine an included angle q2 between the device view plane and a line segment corresponding to the second distance c2;
    detect a third distance c3 between a feature point C' on a lower edge of the front windshield and the central point of the AR device; and
    determine an included angle q3 between the device view plane and a line segment corresponding to the third distance c3.

12. The AR device of claim 11, wherein the instructions are further configured to cause the AR device to be configured to determine the cropping ration coefficient by causing the AR device to be configured to:
    indicate the central point of the AR device as an origin O of a two-dimensional coordinate system XOY;
    indicate, as a straight line L, a straight line that passes through the ranging feature point on the target object and is perpendicular to the device view plane;
    determine a reference plane of the two-dimensional coordinate system XOY based on the origin O and the straight line L;
    indicate a projected straight line of the device view plane on the reference plane as an X axis;
    set a direction of the X axis as a direction in which the origin O is away from the straight line L;
    indicate a projected point of the driver-eye central point on the reference plane as a point A in the two-dimensional coordinate system XOY;
    indicate a projected point of the feature point B' on the reference plane as a point B;
    indicate a projected point of the feature point C' on the reference plane as a point C;
    indicate a projected straight line of a driver view plane on the reference plane as a straight line N, wherein a projection of the point A on the X axis is a point A1, wherein a projection of the point B on the straight line N is a point B1, wherein a projection of the point B on the X axis is a point B2, wherein a projection of the origin O on the straight line L is a point O1, wherein a projection of the point A on the straight line L is a point A2, wherein an intersection point between a straight line of a line segment OB and the straight line L is a point C1, wherein an intersection point between a straight line of a line segment AB and the straight line L is a point C2, and wherein an intersection point between a straight line of a line segment OC and the straight line L is a point C3;

make a length of the line segment OA from the origin O to the point A equivalent to the first distance c1;
make an angle ∠AOA1 equivalent to the included angle q1, wherein the angle ∠AOA1 is formed by the point A, the origin O, and the point A1;
make a length of the line segment OB equivalent to the distance c2;
make an angle ∠BOO1 equivalent to the included angle q2, wherein the angle ∠BOO1 is formed by the point B, the origin O, and the point O1;
make a length of the line segment OC equivalent to the distance c3; and
make an angle ∠COO1 equivalent to the included angle q3, wherein the angle ∠COO1 is formed by the point C, the origin O, and the point O1;
determine a length of a line segment OO1 and an expression of the straight line L according to the distance c0 and the included angle q0, wherein the line segment OO1 is a line segment from the origin O to the point O1;
determine coordinates of the point A according to the length of the line segment OA and the angle ∠AOA1;
determine coordinates of the point B according to the length of the line segment OB and the angle ∠BOO1;
determine coordinates of the point C according to the length of the line segment OC and the angle ∠COO1;
determine coordinates of the point C2 according to an expression of a straight line passing through the point A and the point B and the expression of the straight line L;
determine coordinates of the point C3 according to an expression of a straight line passing through the point C and the origin O and the expression of the straight line L;
determine coordinates of the point C1 according to an expression of a straight line passing through the point B and the origin O and the expression of the straight line L; and
determine the cropping ratio coefficient of the first image according to the coordinates of the point C1, the coordinates of the point C2, and the coordinates of the point C3.

13. A non-transitory computer-readable storage medium comprising instructions that, when executed by an augmented reality (AR) device, cause the AR device to be configured to:
obtain a first image comprising an image of a target object, wherein the AR device is disposed on a center console of a car, and the target object is located in front of the car;
detect an environmental parameter of the AR device based on the first image and one or more distances between a central point of the AR device and one or more other points;
determine a cropping ratio coefficient of the first image based on the environmental parameter of the AR device;
crop the first image based on the cropping ratio coefficient to obtain a second image;
extract M contour feature points in a remaining image of the target object from the second image to generate an AR image of the target object, wherein M is a positive integer;
add the AR image to a third image according to locations of the M contour feature points in the second image, wherein the third image is a blank image, and wherein a size of the third image matches a size of the second image;
determine a projection angle of the AR image based on contour feature points in the AR image and the environmental parameter; and
project the third image on a front windshield of the car according to the projection angle.

14. The non-transitory computer-readable storage medium of claim 13, wherein the instructions cause the AR device to be configured to display the AR image on the front windshield of the car by causing the AR device to be configured to:
determine a projection angle of the AR image based on contour feature points in the AR image and the environmental parameter; and
project the AR image on the front windshield according to the projection angle.

15. The non-transitory computer-readable storage medium of claim 13, wherein the front windshield comprises a display screen, and wherein the instructions cause the AR device to be configured to display the AR image on the front windshield of the car by causing the AR device to be configured to:
determine locations of M projected points that correspond to the M contour feature points and that are on the front windshield; and
display the AR image on the display screen of the front windshield of the car based on the locations of the M projected points.

16. The non-transitory computer-readable storage medium of claim 13, wherein the instructions cause the AR device to be configured to obtain the first image by causing the AR device to be configured to photograph the target object using a ranging feature point on the target object as a focusing reference point to obtain the first image, and wherein a pixel that is in the first image and that corresponds to the focusing reference point is a focus of the first image.

17. The non-transitory computer-readable storage medium of claim 16, wherein the instructions cause the AR device to be configured to detect the environmental parameter by causing the AR device to be configured to:
detect a distance c0 between the ranging feature point and the central point of the AR device based on a relative location of the focus of the first image;
determine an included angle q0 between the device view plane and a line segment corresponding to the distance c0, wherein the device view plane is a device view plane of the AR device;
photograph a driver image to obtain a reference image;
detect a first distance c1 between a driver-eye central point and the central point of the AR device based on a relative location of a driver-eye central point pixel of the reference image in the reference image;
determine an included angle q1 between the device view plane and a line segment corresponding to the first distance c1;
detect a second distance c2 between a feature point B' on an upper edge of the front windshield and the central point of the AR device;
determine an included angle q2 between the device view plane and a line segment corresponding to the second distance c2;
detect a third distance c3 between a feature point C' on a lower edge of the front windshield and the central point of the AR device; and determine an included angle q3 between the device view plane and a line segment corresponding to the third distance c3.

18. The non-transitory computer-readable storage medium of claim 16, wherein the instructions cause the AR device to be configured to detect the environmental parameter by causing the AR device to be configured to:

indicate the central point of the AR device as an origin O of a two-dimensional coordinate system XOY;

indicate, as a straight line L, a straight line that passes through the ranging feature point on the target object and is perpendicular to the device view plane;

determine a reference plane of the two-dimensional coordinate system XOY based on the origin O and the straight line L;

indicate a projected straight line of the device view plane on the reference plane as an X axis;

set a direction of the X axis as a direction in which the origin O is away from the straight line L;

indicate a projected point of the driver-eye central point on the reference plane as a point A in the two-dimensional coordinate system XOY;

indicate a projected point of the feature point B' on the reference plane as a point B;

indicate a projected point of the feature point C' on the reference plane as a point C;

indicate a projected straight line of a driver view plane on the reference plane as a straight line N, wherein a projection of the point A on the X axis is a point A1, wherein a projection of the point B on the straight line N is a point B1, wherein a projection of the point B on the X axis is a point B2, wherein a projection of the origin O on the straight line L is a point O1, wherein a projection of the point A on the straight line L is a point A2, wherein an intersection point between a straight line of a line segment OB and the straight line L is a point C1, wherein an intersection point between a straight line of a line segment AB and the straight line L is a point C2, and wherein an intersection point between a straight line of a line segment OC and the straight line L is a point C3;

make a length of a line segment OA from the origin O to the point A equivalent to the first distance c1;

make an angle $\angle AOA1$ equivalent to the included angle q1, wherein the angle $\angle AOA1$ is formed by the point A, the origin O, and the point A1;

make a length of the line segment OB equivalent to the distance c2;

make an angle $\angle BOO1$ equivalent to the included angle q2, wherein the angle $\angle BOO1$ is formed by the point B, the origin O, and the point O1;

make a length of the line segment OC equivalent to the distance c3;

make an angle $\angle COO1$ equivalent to the included angle q3, wherein the angle $\angle COO1$ is formed by the point C, the origin O, and the point O1;

determine a length of a line segment OO1 and an expression of the straight line L according to the distance c0 and the included angle q0, wherein the line segment OO1 is a line segment from the origin O to the point O1;

determine coordinates of the point A according to the length of the line segment OA and the angle $\angle AOA1$;

determine coordinates of the point B according to the length of the line segment OB and the angle $\angle BOO1$;

determine coordinates of the point C according to the length of the line segment OC and the angle $\angle COO1$;

determine coordinates of the point C2 according to an expression of a straight line passing through the point A and the point B and the expression of the straight line L;

determine coordinates of the point C3 according to an expression of a straight line passing through the point C and the origin O and the expression of the straight line L;

determine coordinates of the point C1 according to an expression of a straight line passing through the point B and the origin O and the expression of the straight line L; and determine the cropping ratio coefficient of the first image according to the coordinates of the point C1, the coordinates of the point C2, and the coordinates of the point C3.

* * * * *